(12) United States Patent  
Xu et al.

(10) Patent No.: US 12,200,787 B2  
(45) Date of Patent: Jan. 14, 2025

(54) COMMUNICATION METHOD AND COMMUNICATION APPARATUS

(71) Applicant: Huawei Technologies Co., Ltd., Shenzhen (CN)

(72) Inventors: Bin Xu, Beijing (CN); Bingzhao Li, Beijing (CN); Zhenzhen Cao, Boulogne Billancourt (FR); Hong Wang, Beijing (CN); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 317 days.

(21) Appl. No.: 17/648,620

(22) Filed: Jan. 21, 2022

(65) Prior Publication Data

US 2022/0150997 A1 May 12, 2022

Related U.S. Application Data

(63) Continuation of application No. PCT/CN2020/103034, filed on Jul. 20, 2020.

(30) Foreign Application Priority Data

Jul. 22, 2019 (CN) .......................... 201910662838.X

(51) Int. Cl.  
*H04W 76/12* (2018.01)  
*H04W 4/06* (2009.01)  
(Continued)

(52) U.S. Cl.  
CPC .............. *H04W 76/12* (2018.02); *H04W 4/06* (2013.01); *H04W 76/11* (2018.02); *H04W 80/02* (2013.01)

(58) Field of Classification Search  
CPC ....... H04W 76/12; H04W 76/11; H04W 4/06; H04W 80/02  
See application file for complete search history.

(56) References Cited

U.S. PATENT DOCUMENTS

2014/0286222 A1* 9/2014 Yu ...................... H04L 12/1886  
370/312  
2014/0301267 A1 10/2014 Gou et al.  
(Continued)

FOREIGN PATENT DOCUMENTS

CN     104619008 A    5/2015  
CN     104871570 A    8/2015  
(Continued)

OTHER PUBLICATIONS

5GXcast, "Broadcast and Multicast Communication Enablers for the Fifth-Generation of Wireless Systems," Deliverable D3.3 RAN Logical Architecture and Interfaces for 5G-Xcast, Version 2.0, Feb. 28, 2019, 95 pages.

(Continued)

*Primary Examiner* — Saad A. Waqas  
(74) *Attorney, Agent, or Firm* — Slater Matsil, LLP

(57) ABSTRACT

A first apparatus establishes a first radio link control RLC entity and a second RLC entity, where the first RLC entity and the second RLC entity are associated with a first packet data convergence protocol PDCP entity. The first apparatus sends first data through the first RLC entity and/or the second RLC entity. The first RLC entity corresponds to a unicast transmission mode, and the second RLC entity corresponds to a multicast transmission mode.

20 Claims, 10 Drawing Sheets

(51) Int. Cl.
*H04W 76/11* (2018.01)
*H04W 80/02* (2009.01)

(56) References Cited

U.S. PATENT DOCUMENTS

| | | |
|---|---|---|
| 2017/0181185 A1 | 6/2017 | Lee et al. |
| 2018/0199365 A1 | 7/2018 | Yi et al. |
| 2020/0163005 A1* | 5/2020 | Rao ........................ H04W 76/27 |

FOREIGN PATENT DOCUMENTS

| | | | | |
|---|---|---|---|---|
| CN | 105025593 A | | 11/2015 | |
| CN | 109792587 A | | 5/2019 | |
| CN | 109982266 A | * | 7/2019 | ........... H04L 12/433 |
| CN | 110505160 A | | 11/2019 | |
| CN | 110769377 A | | 2/2020 | |
| WO | 2012067367 A2 | | 5/2012 | |
| WO | WO-2019129212 A1 | * | 7/2019 | ........... H04L 12/433 |
| WO | 2020035795 A1 | | 2/2020 | |

OTHER PUBLICATIONS

5G PPP Architecture Working Group, "View on 5G Architecture", Version 3.0, Jun. 19, 2019, 166 pages.

* cited by examiner

COMMUNICATION METHOD AND COMMUNICATION APPARATUS

CROSS-REFERENCE TO RELATED APPLICATIONS

This application is a continuation of International Application No. PCT/CN2020/103034, filed on Jul. 20, 2020, which claims priority to Chinese Patent Application No. 201910662838. X, filed on Jul. 22, 2019. The disclosures of the aforementioned applications are hereby incorporated by reference in their entireties.

TECHNICAL FIELD

This application relates to the communication field, and more specifically, to a communication method and a communication apparatus.

BACKGROUND

A multicast transmission technology is a technology in which a network device simultaneously sends same data to a plurality of terminal devices, that is, point-to-multipoint transmission. When the multicast technology is used for transmission, a plurality of terminal devices simultaneously attempt to receive same data in a process in which a network device (for example, a base station) sends the same data. A unicast transmission technology (or referred to as a unicast transmission mode) is a technology in which a network device simultaneously sends same data to only one terminal device, that is, point-to-point transmission.

A network device and a terminal device that communicate with each other have specific protocol layer structures. The protocol layer structure may include protocol layers such as a radio resource control (RRC) layer, a packet data convergence protocol (PDCP) layer, a radio link control (radio link control, RLC) layer, a media access control (MAC) layer, and a physical (PHY) layer. Each layer has a corresponding functional entity to perform a corresponding function. For example, the PDCP layer corresponds to a PDCP entity, and the RLC layer corresponds to an RLC entity. When the network device and the terminal device perform data transmission, data needs to sequentially pass through layers on the network device and the terminal device, and corresponding processing is performed on the data at the layers.

Currently, when the data is transmitted between the network device and the terminal device in a multicast transmission mode, a transmission failure may occur, resulting in relatively low reliability of data transmission. In addition, when the network device needs to switch between the multicast transmission mode and the unicast transmission mode, the network device needs to release a configuration of an original transmission mode by using RRC signaling, and then establish a configuration of a new transmission mode by using RRC signaling. Consequently, signaling overheads and a delay in a switching process are relatively large, and communication efficiency is greatly reduced.

SUMMARY

This application provides a communication method and a communication apparatus. One PDCP is configured to be associated with a plurality of RLC entities, and the plurality of RLC entities include an RLC entity corresponding to a unicast transmission mode and an RLC entity corresponding to a multicast transmission mode. During data transmission, data is transmitted through the RLC entity corresponding to the unicast transmission mode and/or the RLC entity corresponding to the multicast transmission mode. In this way, flexible switching can be performed between the unicast transmission mode and the multicast transmission mode. Therefore, signaling overheads and a delay during transmission mode switching can be reduced, and reliability of the data transmission can be improved.

According to a first aspect, a communication method is provided. The method may be performed by a first apparatus, or may be performed by a chip used in the first apparatus. For example, the first apparatus may be a network device, or the first apparatus may be a centralized unit (CU) in a scenario in which the CU and a distributed unit (DU) are separately disposed. That the method is performed by the first apparatus is used as an example. The method includes: The first apparatus establishes a first RLC entity and a second RLC entity, where the first RLC entity and the second RLC entity are associated with a first PDCP entity. The first apparatus sends first data through the first RLC entity and/or the second RLC entity. The first RLC entity corresponds to a unicast transmission mode, and the second RLC entity corresponds to a multicast transmission mode.

According to the communication method provided in the first aspect, when the first apparatus needs to perform transmission mode switching, a configuration of the original unicast transmission mode or the original multicast transmission mode does not need to be released, flexible switching between different transmission modes can be completed only by stopping using the unicast transmission mode or the multicast transmission mode, and there is no need to perform a reconfiguration process. Therefore, signaling overheads and a delay during the transmission mode switching are reduced. In addition, when both the unicast transmission mode and the multicast transmission mode are used, same data may be repeatedly sent and received in different transmission modes. Therefore, reliability of data transmission can be improved.

In a possible implementation of the first aspect, the method further includes: The first apparatus sends first indication information to a second apparatus, where the first indication information is used to indicate that a third RLC entity of the second apparatus corresponds to the unicast transmission mode and a fourth RLC entity of the second apparatus corresponds to the multicast transmission mode, and the third RLC entity and the fourth RLC entity are associated with a second PDCP entity. In this implementation, the first apparatus notifies the second apparatus of a type of each of a plurality of RLC entities, so that the second apparatus establishes the third RLC entity and the fourth RLC entity. This can improve accuracy and efficiency of establishing the third RLC entity and the fourth RLC entity by the second apparatus, thereby facilitating implementation and achieving low complexity.

In a possible implementation of the first aspect, the first indication information is used to indicate a type of the third RLC entity and a type of the fourth RLC entity; or the first indication information includes radio network temporary identifier RNTI type information corresponding to the third RLC entity and RNTI type information corresponding to the fourth RLC entity. In this implementation, efficiency and accuracy of determining the third RLC entity and the fourth RLC entity by the second apparatus can be improved, thereby facilitating implementation.

In a possible implementation of the first aspect, an RNTI type corresponding to the third RLC entity is a cell radio network temporary identifier C-RNTI, and an RNTI type corresponding to the fourth RLC entity is a group radio network temporary identifier G-RNTI.

In a possible implementation of the first aspect, the method further includes: The first apparatus sends second indication information to the second apparatus, where the second indication information is used to indicate a first radio bearer and a first transmission mode corresponding to the first radio bearer, and the first radio bearer includes the first PDCP entity. The first transmission mode is the unicast transmission mode, the multicast transmission mode, or the unicast transmission mode and the multicast transmission mode. In this implementation, switching between transmission modes used for transmission between the first apparatus and the second apparatus can be quickly and flexibly implemented, and signaling overheads for indicating transmission mode switching can be reduced. In addition, the second apparatus may adjust a data receiving mode based on the indication information, so that the second apparatus can receive data more accurately. This improves reliability of data transmission, and reduces a waste of resources of the second apparatus.

In a possible implementation of the first aspect, the first apparatus receives third indication information from a third apparatus, where the third indication information is used to indicate that the first RLC entity corresponds to the unicast transmission mode and the second RLC entity corresponds to the multicast transmission mode. The first apparatus is a DU, and the third apparatus is a CU. In this implementation, flexible switching between transmission modes of the first apparatus can be implemented.

In a possible implementation of the first aspect, the third indication information is used to indicate a type of the first RLC entity and a type of the second RLC entity; or the third indication information includes RNTI type information corresponding to the first RLC entity and RNTI type information corresponding to the second RLC entity.

In a possible implementation of the first aspect, an RNTI type corresponding to the first RLC entity is a cell radio network temporary identifier C-RNTI, and an RNTI type corresponding to the second RLC entity is a group radio network temporary identifier G-RNTI.

In a possible implementation of the first aspect, the method further includes: The first apparatus scrambles data from the first RLC entity by using a cell radio network temporary identifier C-RNTI; and/or scrambles a transport block TB of data from the second RLC entity by using a group radio network temporary identifier G-RNTI. In this implementation, reliability and security of data transmission can be improved.

According to a second aspect, a communication method is provided. The method may be performed by a second apparatus, or may be performed by a chip used in the second apparatus. For example, the second apparatus may be a terminal device. That the method is performed by the second apparatus is used as an example. The method includes: The second apparatus establishes a third RLC entity and a fourth RLC entity, where the third RLC entity and the fourth RLC entity are associated with a second PDCP entity. The second apparatus receives first data through the third RLC entity and/or the fourth RLC entity. The third RLC entity corresponds to a unicast transmission mode, and the fourth RLC entity corresponds to a multicast transmission mode.

According to the communication method provided in the second aspect, when transmission mode switching needs to be performed, flexible switching between different transmission modes can be completed only by stopping using the unicast transmission mode or the multicast transmission mode, and there is no need to perform a reconfiguration process. Therefore, signaling overheads and a delay during the transmission mode switching are reduced. When both the unicast transmission mode and the multicast transmission mode are used, same data may be repeatedly received in different transmission modes. Therefore, reliability of data receiving can be improved.

In a possible implementation of the second aspect, the method further includes: The second apparatus receives first indication information, where the first indication information is used to indicate that the third RLC entity corresponds to the unicast transmission mode and the fourth RLC entity corresponds to the multicast transmission mode. That the second apparatus establishes a third RLC entity and a fourth RLC entity includes: The second apparatus establishes the third RLC entity and the fourth RLC entity based on the first indication information. In this implementation, the first apparatus notifies the second apparatus of a type of each of a plurality of RLC entities, so that the second apparatus establishes the third RLC entity and the fourth RLC entity. This can improve accuracy and efficiency of establishing the third RLC entity and the fourth RLC entity by the second apparatus, thereby facilitating implementation and achieving low complexity.

In a possible implementation of the second aspect, the first indication information is used to indicate a type of the third RLC entity and a type of the fourth RLC entity; or the first indication information includes radio network temporary identifier RNTI type information corresponding to the third RLC entity and RNTI type information corresponding to the fourth RLC entity. In this implementation, efficiency and accuracy of determining the third RLC entity and the fourth RLC entity by the second apparatus can be improved, thereby facilitating implementation.

In a possible implementation of the second aspect, an RNTI type corresponding to the third RLC entity is a cell radio network temporary identifier C-RNTI, and an RNTI type corresponding to the fourth RLC entity is a group radio network temporary identifier G-RNTI.

In a possible implementation of the second aspect, the method further includes: The second apparatus receives second indication information, where the second indication information is used to indicate a first radio bearer and a first transmission mode corresponding to the first radio bearer, and the first radio bearer includes the second PDCP entity. The first transmission mode is the unicast transmission mode, the multicast transmission mode, or the unicast transmission mode and the multicast transmission mode. In this implementation, switching between transmission modes used for transmission between the first apparatus and the second apparatus can be quickly and flexibly implemented, and signaling overheads for indicating transmission mode switching can be reduced. In addition, the second apparatus may adjust a data receiving mode based on the indication information, so that the second apparatus can receive data more accurately. This improves reliability of data transmission, and reduces a waste of resources of the second apparatus.

In a possible implementation of the second aspect, when the first data is received through only the third RLC entity, the method further includes: The second apparatus stops monitoring a first RNTI, where the first RNTI is used to receive data transmitted in the first radio bearer in the multicast transmission mode, and the first radio bearer includes the second PDCP entity. In this implementation, resource consumption of the second apparatus can be reduced. For example, the second apparatus may be enabled to be more power-saving, and use time of the second apparatus may be prolonged.

In a possible implementation of the second aspect, the method further includes: The second apparatus delivers the received first data scrambled by using a cell radio network temporary identifier C-RNTI to the third RLC entity; and/or delivers the received first data scrambled by using a group radio network temporary identifier G-RNTI to the fourth RLC entity. In this implementation, reliability and security of data transmission can be improved.

According to a third aspect, a communication apparatus is provided. The apparatus includes units configured to perform the steps in any one of the first aspect or the possible implementations of the first aspect.

According to a fourth aspect, a communication apparatus is provided. The apparatus includes units configured to perform the steps in any one of the second aspect or the possible implementations of the second aspect.

In a design, the communication apparatus is a communication chip. The communication chip may include an input circuit or interface configured to send information or data, and an output circuit or interface configured to receive information or data.

In another design, the communication apparatus is a communication device (for example, a terminal device, an access network device, or a core network device). A communication chip may include a transmitter configured to send information or data, and a receiver configured to receive information or data.

According to a fifth aspect, a communication apparatus is provided. The apparatus includes at least one processor and a memory. The at least one processor obtains a program or instructions in the memory. The at least one processor is configured to execute the program or the instructions to enable the communication apparatus to perform the method according to any one of the first aspect or the possible implementations of the first aspect.

According to a sixth aspect, a communication apparatus is provided. The apparatus includes at least one processor and a memory. The at least one processor obtains a program or instructions in the memory. The at least one processor is configured to execute the program or the instructions to enable the communication apparatus to perform the method according to any one of the second aspect or the possible implementations of the second aspect.

According to a seventh aspect, a communication apparatus is provided. The apparatus includes at least one processor and an interface circuit. The interface circuit is used by the at least one processor to obtain a program or instructions in at least one memory. The at least one processor is configured to execute the program or the instructions to enable the communication apparatus to perform the method according to any one of the first aspect or the possible implementations of the first aspect.

According to an eighth aspect, a communication apparatus is provided. The apparatus includes at least one processor and an interface circuit. The interface circuit is used by the at least one processor to obtain a program or instructions in at least one memory. The at least one processor is configured to execute the program or the instructions to enable the communication apparatus to perform the method according to any one of the second aspect or the possible implementations of the second aspect.

According to a ninth aspect, a processor is provided. The processor includes an input circuit, an output circuit, and a processing circuit. The processing circuit is configured to: receive a signal through the input circuit, and transmit a signal through the output circuit, so that the processor performs the method according to any one of the first aspect, the second aspect, the possible implementations of the first aspect, or the possible implementations of the second aspect.

During specific implementation, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to a tenth aspect, a network device is provided. The network device includes the communication apparatus provided in the third aspect, or the network device includes the communication apparatus provided in the fifth aspect, or the network device includes the communication apparatus provided in the seventh aspect.

According to an eleventh aspect, a terminal device is provided. The terminal device includes the communication apparatus provided in the fourth aspect, the terminal includes the communication apparatus provided in the sixth aspect, or the terminal includes the communication apparatus provided in the eighth aspect.

According to a twelfth aspect, a computer program product is provided. The computer program product includes a computer program. When being executed by a processor, the computer program is used to perform the method according to any one of the first aspect or the possible implementations of the first aspect, or perform the method according to any one of the second aspect or the possible implementations of the second aspect.

According to a thirteenth aspect, a computer-readable storage medium is provided. The computer-readable storage medium stores a computer program. When being executed, the computer program is used to perform the method according to any one of the first aspect or the possible implementations of the first aspect, or perform the method according to any one of the second aspect or the possible implementations of the second aspect.

According to the solutions provided in this application, one PDCP is configured to be associated with a plurality of RLC entities, and the plurality of RLC entities include an RLC entity corresponding to the unicast transmission mode and an RLC entity corresponding to the multicast transmission mode. During data transmission, data is transmitted through the RLC entity corresponding to the unicast transmission mode and/or the RLC entity corresponding to the multicast transmission mode. In this way, flexible switching can be performed between the unicast transmission mode and the multicast transmission mode, and transmission mode switching does not need to be performed through reconfiguration using RRC signaling. Therefore, signaling overheads and a delay during the transmission mode switching can be reduced, and reliability of the data transmission can be improved.

DETAILED DESCRIPTION OF ILLUSTRATIVE EMBODIMENTS

Figure 1:
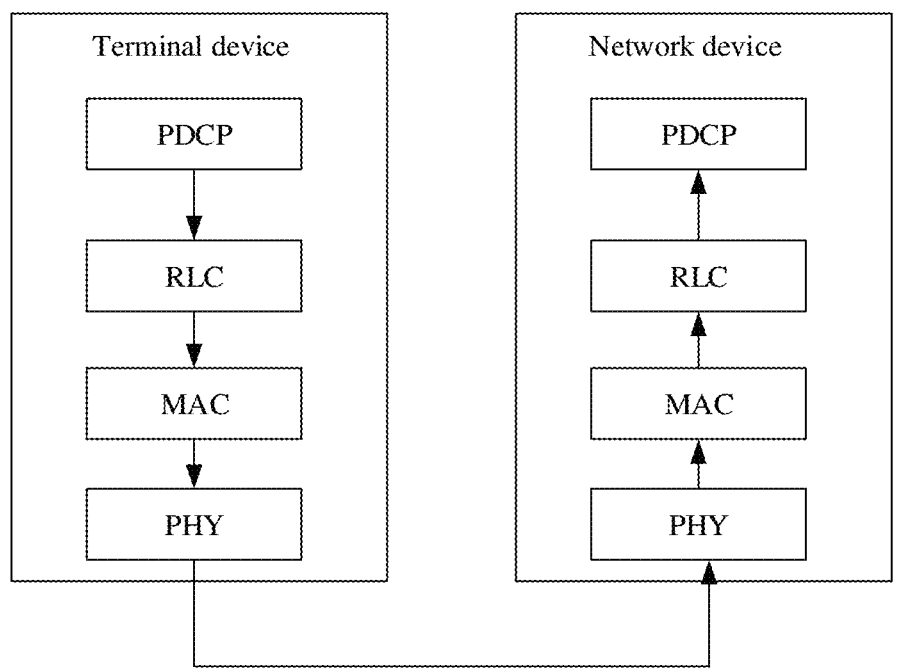
FIG. 1 is a schematic diagram of data transmission at layers of protocol stacks.

The following describes technical solutions of this application with reference to the accompanying drawings.

The technical solutions of embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or a new radio (NR) system.

A terminal device in the embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. Alternatively, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

In the embodiments of this application, a network device may be a device configured to communicate with a terminal device. The network device may be a base transceiver station (BTS) in a global system for mobile communications (GSM) or a code division multiple access (CDMA) system, may be a NodeB (NodeB, NB) in a wideband code division multiple access (WCDMA) system, may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or the like. This is not limited in the embodiments of this application.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a wireless channel, and various other media that can store, include, and/or carry instructions and/or data.

For ease of understanding the embodiments of this application, the following describes some terms in the embodiments of this application, to help a person skilled in the art have a better understanding.

(1) A network device is a device that can provide a random access function for a terminal device or a chip that can be disposed in the device. The device includes but is not limited to an evolved NodeB (eNB), a radio network controller (RNC), a NodeB (NB), a base station controller (BSC), a base transceiver station (BTS), a home base station (for example, home evolved NodeB or home NodeB, HNB), a baseband unit (BBU), an access point (AP) in a wireless fidelity (Wi-Fi) system, a wireless relay node, a wireless backhaul node, a transmission point (transmission and reception point (TRP) or transmission point (TP)), or the like, may be a gNB or a transmission point (TRP or TP) in a 5G system such as an NR system or one or one group of antenna panels (including a plurality of antenna panels) of a base station in a 5G system, or may be a network node forming a gNB or a transmission point, for example, a baseband unit (BBU) or a distributed unit (DU).

(2) A terminal is also be referred to as user equipment (UE), a mobile station (MS), a mobile terminal (MT), or the like, and is a device that provides a user with voice and/or data connectivity. For example, the terminal device includes a handheld device, a vehicle-mounted device, or the like that has a wireless connection function. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like.

(3) A multicast transmission technology, which may also be referred to as a multimedia broadcast multicast service (MBMS) technology or a multicast transmission mode, is a technology in which data of a specific service is simultaneously sent to a plurality of terminal devices through a network device. When the multicast technology is used for transmission, a plurality of terminal devices simultaneously attempt to receive same data in a process in which a network device (for example, a base station) sends the same data. Currently, multicast transmission technologies are mainly classified into two types: a multimedia broadcast multicast service single frequency network (MBSFN) service and a single cell point to multipoint (SC-PTM) service. The MBSFN mode means that a plurality of mutually synchronized cells (for example, a plurality of base stations) in an MBSFN area simultaneously transmit same information to a plurality of terminal devices, and the terminal devices receive single data obtained after superposition. In this way, strength of a received signal can be improved, and inter-cell interference can be eliminated. The SC-PTM mode means that an MBMS service is transmitted via only one cell (for example, one base station), and one network device simultaneously performs group scheduling on a plurality of terminal devices.

(4) That sending is performed in a multicast (multicast) transmission mode means: When sending a transport block (TB) corresponding to a protocol data unit (PDU), an apparatus scrambles the PDU or downlink control information (DCI) corresponding to the PDU by using a group radio network temporary identifier (G-RNTI), and one or more apparatuses simultaneously attempt to receive the same PDU based on the same G-RNTI. Alternatively, that a PDU is transmitted in a multicast mode may mean: A location of the same PDU is notified to a plurality of apparatuses in a semi-persistent manner, and the plurality of apparatuses may simultaneously attempt to receive the PDU. Alternatively, that a PDU is transmitted in a multicast mode may mean: The PDU is transmitted on a radio bearer established for multicast transmission or on a channel specially designed for multicast.

That receiving is performed in the multicast transmission mode means: When sending is performed in the multicast mode, one of the plurality of receiving apparatuses attempts to receive the PDU based on the G-RNTI, or one of the plurality of receiving apparatuses attempts to receive the PDU on the radio bearer established for multicast transmission or on the channel used for multicast transmission.

In this application, multicast is a specific mode of multicast. Therefore, multicast may also be referred to as multicast.

(5) That sending is performed in a unicast transmission mode means: When sending a TB corresponding to a PDU, an apparatus scrambles the PDU or DCI corresponding to the PDU by using a cell radio network temporary identifier (C-RNTI), and only one apparatus attempts to receive the same PDU based on the C-RNTI. Alternatively, that a PDU is transmitted in a unicast mode may mean: The PDU is transmitted on a radio bearer established for unicast transmission or on a channel specially designed for unicast.

That receiving is performed in the unicast transmission mode means: When sending is performed in the unicast mode, the receiving apparatus attempts to receive the PDU based on the C-RNTI, or the apparatus attempts to receive the PDU on the radio bearer established for unicast transmission or on the channel used for unicast transmission.

(6) That sending and receiving are performed in a broadcast transmission mode means: An apparatus sends a TB corresponding to a PDU on a broadcast channel, and all receiving apparatuses may attempt to receive the PDU on the broadcast channel.

A network device and a terminal device that communicate with each other have specific protocol layer structures. For example, a control plane protocol layer structure may include functions of protocol layers such as an RRC layer, a PDCP layer, an RLC layer, a MAC layer, and a physical layer. A user plane protocol layer structure may include functions of protocol layers such as a PDCP layer, an RLC layer, a MAC layer, and a physical layer. The physical layer is located at the lowest layer (layer 1), the MAC layer, the RLC layer, and the PDCP layer belong to the second layer (layer 2), and the RRC layer belongs to the third layer (layer 3). In an implementation, a service data adaptation protocol (SDAP) layer may be further included above the PDCP layer.

Functions of these protocol layers may be implemented by one node, or may be implemented by a plurality of nodes. For example, in an evolved structure, a radio access network device may include a centralized unit (CU) and a distributed unit (DU). A plurality of DUs may be centrally controlled by one CU. The CU and the DU may be obtained through division based on a protocol layer of a wireless network. For example, functions of the PDCP layer and a layer above the PDCP layer are set on the CU, and functions of protocol layers below the PDCP layer, such as the RLC layer and the MAC layer, are set on the DU.

It should be understood that division based on the protocol layer is merely an example, and division may alternatively be performed based on another protocol layer. For example, division is performed based on the RLC layer. In this case, functions of the RLC layer and a layer above the RLC layer are set on the CU, and a function of a protocol layer below the RLC layer is set on the DU. Alternatively, division is performed at a protocol layer. For example, a part of functions of the RLC layer and a function of a protocol layer above the RLC layer are set on the CU, and a remaining function of the RLC layer and a function of a protocol layer below the RLC layer are set on the DU. In addition, division may alternatively be performed in another manner. For example, division is performed based on a delay. A function whose processing time needs to meet a delay requirement is set on the DU, and a function whose processing time does not need to meet the delay requirement is set on the CU.

Uplink data transmission is used as an example to describe data transmission between a network device and a terminal device. FIG. 1 is a schematic diagram of data transmission at layers of protocol stacks. Data first arrives at a PDCP layer of the terminal device. After being processed at the PDCP layer, the data is transmitted to an RLC layer and a MAC layer. After being processed at the MAC layer, the data is sent to the network device via a physical layer. When the network device receives the data, protocol layers that the data sequentially passes through are a physical layer, a MAC layer, an RLC layer, and a PDCP layer. Data on each radio bearer needs to be processed at each layer. Each layer has a corresponding functional entity to perform a corresponding function. For example, the PDCP layer corresponds to a PDCP entity, the RLC layer corresponds to an RLC entity, and the MAC layer corresponds to a MAC entity. Each radio bearer includes one PDCP entity and one or more RLC entities, and each RLC entity corresponds to one logical channel. One MAC entity corresponds to a plurality of logical channels. Data on the logical channels may be multiplexed at the MAC layer, for example, multiplexed into a same data block at the MAC layer, and finally sent via the physical layer. A downlink data transmission process is similar.

Currently, when data is transmitted between a network device and a terminal device in a multicast transmission mode, data in one PDCP entity is sent through only one RLC entity, the data in the RLC entity is transmitted to a MAC entity for packet assembly, and then a data packet is sent via a physical layer. A plurality of terminal devices attempt to receive the data packet. Assuming that some terminal devices do not receive the data packet, a packet loss occurs. Some services, for example, a service in an industrial scenario or a batch terminal device software update service, have a relatively high requirement on reliability of data. If a data packet is lost, software update fails, and update needs to be performed again. This seriously affects reliability of service transmission. In addition, when the network device needs to switch between the multicast transmission mode and a unicast transmission mode, the network device needs to release a configuration of an original transmission mode by using radio resource control (RRC) signaling, and then establish a configuration of a new transmission mode by using RRC signaling. Consequently, signaling overheads and a delay in a switching process are relatively large, and communication efficiency is greatly reduced.

In view of this, this application provides a communication method. One PDCP is configured to be associated with a plurality of RLC entities, and the plurality of RLC entities include an RLC entity corresponding to a unicast transmission mode and an RLC entity corresponding to a multicast transmission mode. During data transmission, data is transmitted through the RLC entity corresponding to the unicast transmission mode and/or the RLC entity corresponding to the multicast transmission mode. In this way, flexible switching can be performed between the unicast transmission mode and the multicast transmission mode, and transmission mode switching does not need to be performed through reconfiguration using RRC signaling. Therefore, signaling overheads and a delay during the transmission mode switching can be reduced, and reliability of the data transmission can be improved.

For ease of understanding the embodiments of this application, a communication system to which the embodiments of this application are applicable is first briefly described with reference to FIG. 2.

Figure 2:
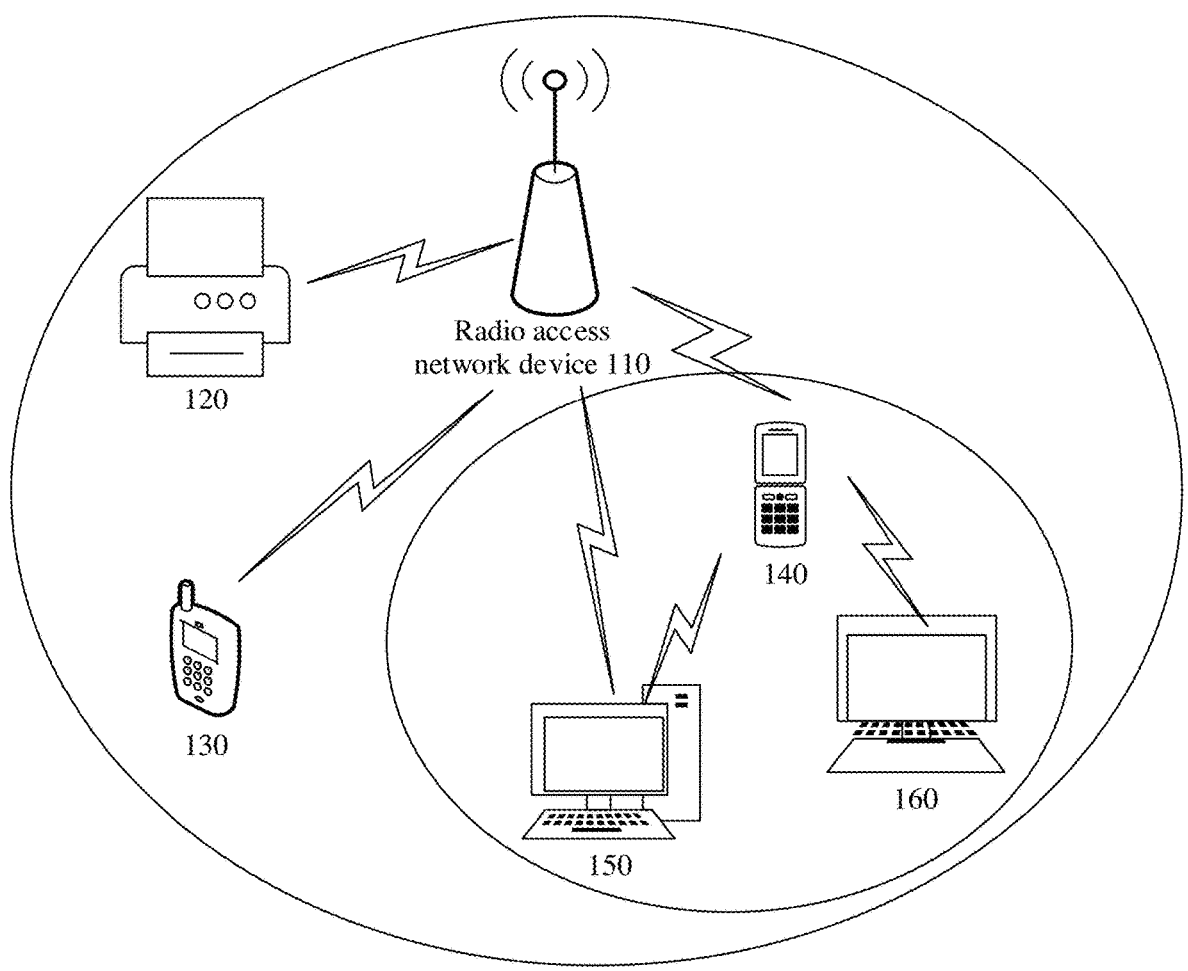
FIG. 2 is a schematic diagram of an architecture of a mobile communication system to which an embodiment of this application is applicable.

FIG. 2 is a schematic diagram of a communication system to which an embodiment of this application is applicable. As shown in FIG. 2, the mobile communication system may include at least one radio access network device no and at least one terminal device (terminal devices 120, 130, 140, 150, and 160 shown in FIG. 2). The terminal device is connected to the radio access network device in a wireless manner, and the radio access network device may be the foregoing network device. The at least one terminal device may send uplink data or information to the radio access network device, or the radio access network device no may send downlink data or information to the at least one terminal device. In addition, a plurality of terminal devices may form a communication system. For example, the terminal devices 140, 150, and 160 may form a communication system. The terminal device 140 may also send downlink data or information to the terminal devices 150 and 160, and the terminal devices 150 and 160 may also send uplink data or information to the terminal device 140. Uplink and downlink data and information related to a URLLC service may be transmitted between the terminal device and the radio access network device.

It should be understood that, FIG. 2 is only a schematic diagram, and the communication system may further include another network device and/or another terminal device that are/is not shown in FIG. 2. Quantities of radio access network devices and terminals included in the mobile communication system are not limited in the embodiments of this application. In the mobile communication system, the radio access network device no may be the foregoing network device. In addition, communication between the network device and the terminal device complies with a specific protocol layer structure, for example, the protocol layer architecture shown in FIG. 1. The network device may include a CU and a DU, and the CU and the DU may be disposed separately, or may be disposed in a centralized manner. This is not limited in this embodiment of this application.

Figure 3:
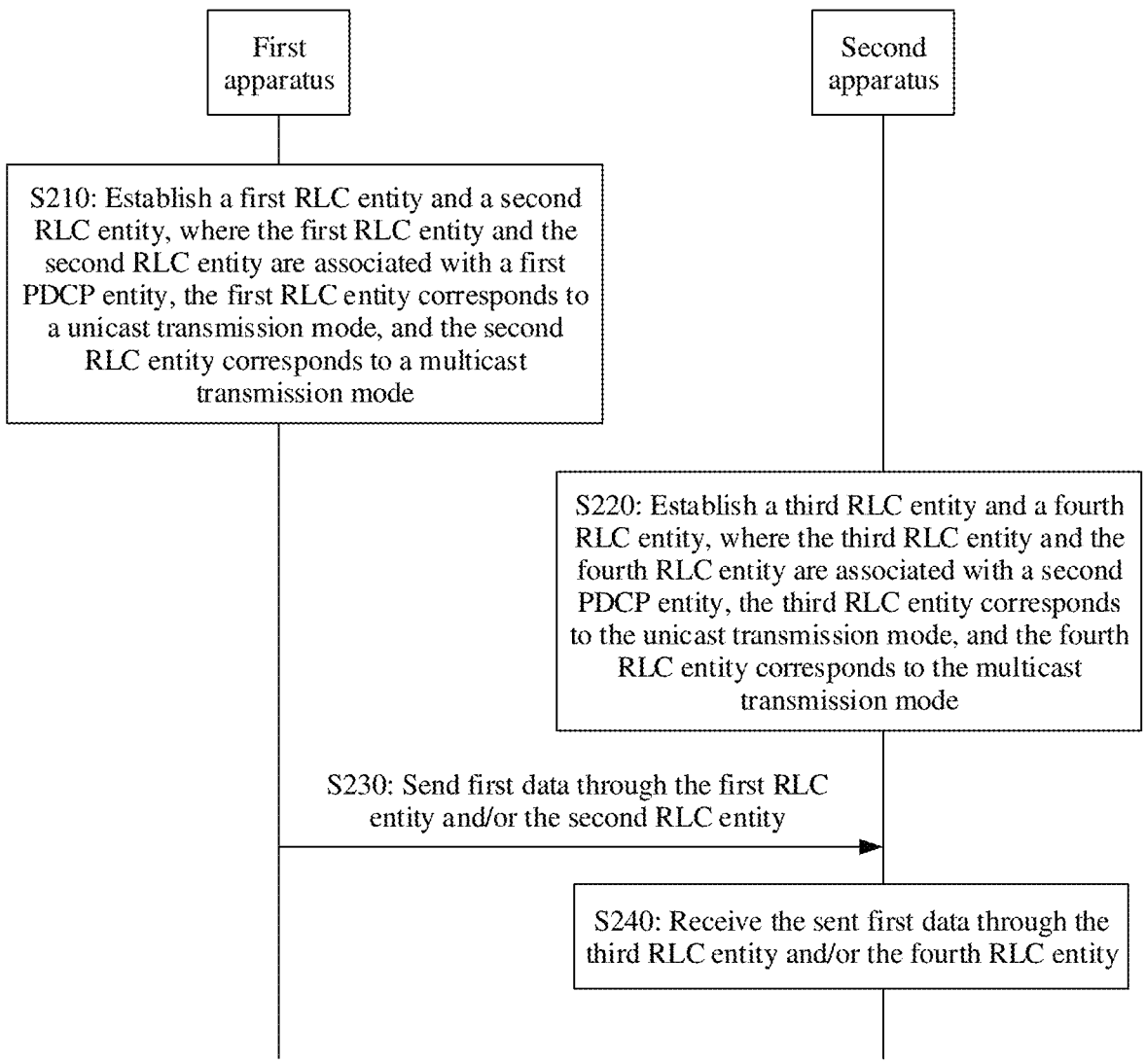
FIG. 3 is a schematic interaction diagram of a communication method according to an embodiment of this application.

The following describes in detail the communication method provided in this application with reference to FIG. 3. FIG. 3 is a schematic flowchart of a communication method 200 according to an embodiment of this application. The method 200 may be applied to the scenario shown in FIG. 2, for example, a scenario in which transmission is performed in a multicast transmission mode and/or a unicast transmission mode. This is not limited in this embodiment of this application.

It should be understood that, in the following descriptions, an example in which the methods in the embodiments is performed by a first apparatus and a second apparatus is used to describe the methods in the embodiments. The first apparatus may be the foregoing access network device, and the second apparatus may be the foregoing terminal device. If the access network device is in a mode in which a CU and a DU are separately disposed, the foregoing first apparatus may be a DU. By way of example, and not limitation, the method may alternatively be performed by chips used in the first apparatus and the second apparatus.

As shown in FIG. 3, the method 200 shown in FIG. 3 may include step S210 to step S240. The following describes in detail the steps in the method 200 with reference to FIG. 3. The method 200 includes the following steps.

S210: The first apparatus establishes a first RLC entity and a second RLC entity, where the first RLC entity and the second RLC entity are associated with a first PDCP entity. The first RLC entity corresponds to the unicast transmission mode, and the second RLC entity corresponds to the multicast transmission mode.

S220: The second apparatus establishes a third RLC entity and a fourth RLC entity, where the third RLC entity and the fourth RLC entity are associated with a second PDCP entity. The third RLC entity corresponds to the unicast transmission mode, and the fourth RLC entity corresponds to the multicast transmission mode.

S230: The first apparatus sends first data to the second apparatus through the first RLC entity and/or the second RLC entity.

S240: The second apparatus receives, through the third RLC entity and/or the fourth RLC entity, the first data sent by the first apparatus.

Specifically, in S210, when the first apparatus needs to send data (the first data) to the second apparatus, a plurality of RLC entities are first established in a protocol stack of the first apparatus, and the plurality of RLC entities are associated with one PDCP entity (the first PDCP entity). That the plurality of RLC entities are associated with the first PDCP entity may be understood as that the first PDCP entity and the plurality of RLC entities belong to a same radio bearer, or an identifier (ID) included in a configuration of the first PDCP entity and identifiers included in configurations of the plurality of RLC entities are the same. The identifier may be a radio bearer identifier. One RLC entity corresponds to one logical channel. In the descriptions of the embodiments of this application, the "RLC entity" and the "logical channel" may be considered as equivalent concepts, and may be replaced with each other. For example, it may alternatively be described as that one PDCP entity is associated with a plurality of logical channels, or an ID included in a configuration of the first PDCP entity and IDs included in configurations of the plurality of logical channels are the same. Other descriptions for the RLC entity are also applicable to a concept of the logical channel. In addition, it may also be considered that the concept of the logical channel includes a concept of the RLC entity, or the logical channel may be considered as an interface or a channel connecting the RLC entity to a MAC entity. The first apparatus may establish a plurality of RLC entities associated with the first PDCP entity, and the plurality of RLC entities include the first RLC entity and the second RLC entity. The first RLC entity corresponds to the unicast transmission mode, and the second RLC entity corresponds to the multicast transmission mode. That the first RLC entity corresponds to the unicast transmission mode may be understood as that data in the first RLC entity is sent in a unicast sending mode. That the second RLC entity corresponds to the multicast transmission mode may be understood as that data in the second RLC entity is sent in a multicast sending mode. That the first RLC entity corresponds to the unicast transmission mode may also be referred to as that a type of the first RLC entity is a unicast type, or a type of a logical channel corresponding to the first RLC entity is a unicast logical channel type. The RLC entity of the unicast type may be understood as that data in the first RLC entity is sent in the unicast mode, and the unicast logical channel type may be understood as that data on the logical channel corresponding to the first RLC entity is sent in the unicast mode. Similar to the first apparatus, in S220, the second apparatus also establishes a plurality of RLC entities in a protocol stack of the second apparatus. The plurality of RLC entities are associated with one PDCP entity (the second PDCP entity) of the second apparatus. The plurality of RLC entities include the third RLC entity and the fourth RLC entity. The third RLC entity corresponds to the unicast transmission mode, and the fourth RLC entity corresponds to the multicast transmission mode. That the third RLC entity corresponds to the unicast transmission mode may be understood as that data received in the third RLC entity is received in the unicast mode, or data received on a logical channel corresponding to the third RLC entity is received in the unicast mode, that is, a physical layer entity and a MAC layer entity in the second apparatus need to deliver data received in the unicast transmission mode to the third RLC entity. That the fourth RLC entity corresponds to the unicast transmission mode may be understood as that data received in the fourth RLC entity is received in the multicast mode, or data received on a logical channel corresponding to the fourth RLC entity is received in the multicast mode, that is, a physical layer entity and a MAC layer entity in the second apparatus need to deliver data received in the multicast transmission mode to the fourth RLC entity.

It should be understood that there may be only one first RLC entity or more first RLC entities. Similarly, there may be one or more second RLC entities, third RLC entities, and fourth RLC entities.

In S230, the first apparatus sends the first data to the second apparatus through the first RLC entity and/or the second RLC entity. Specifically, the first apparatus may send the first data to the second apparatus through only the first RLC entity (in the unicast transmission mode). Alternatively, the first apparatus may send the first data to the second apparatus through only the second RLC entity (in the multicast transmission mode). Alternatively, the first apparatus may send the first data to the second apparatus through the first RLC entity and the second RLC entity (in the unicast transmission mode and the multicast transmission mode). Correspondingly, in S240, the second apparatus receives, through the third RLC entity and/or the fourth RLC entity, the first data sent by the first apparatus. Specifically, when the first apparatus sends the first data to the second apparatus through only the first RLC entity, the second apparatus receives the first data through only the third RLC entity. When the first apparatus sends the first data to the second apparatus through only the second RLC entity, the second apparatus receives the first data through only the fourth RLC entity. When the first apparatus sends the first data to the second apparatus through the first RLC entity and the second RLC entity, the second apparatus receives the first data through the third RLC entity and the fourth RLC entity, that is, the second apparatus may repeatedly receive the first data in the unicast transmission mode and the multicast transmission mode.

According to the communication method provided in this application, when the first apparatus needs to perform transmission mode switching, a configuration of the original unicast transmission mode or the original multicast transmission mode does not need to be released, flexible switching between different transmission modes can be completed only by stopping using the unicast transmission mode or the multicast transmission mode, and there is no need to perform a reconfiguration process. Therefore, signaling overheads and a delay during the transmission mode switching are reduced. In addition, when both the unicast transmission mode and the multicast transmission mode are used, same data may be repeatedly sent and received in different transmission modes. Therefore, reliability of data transmission can be improved.

Figure 4:
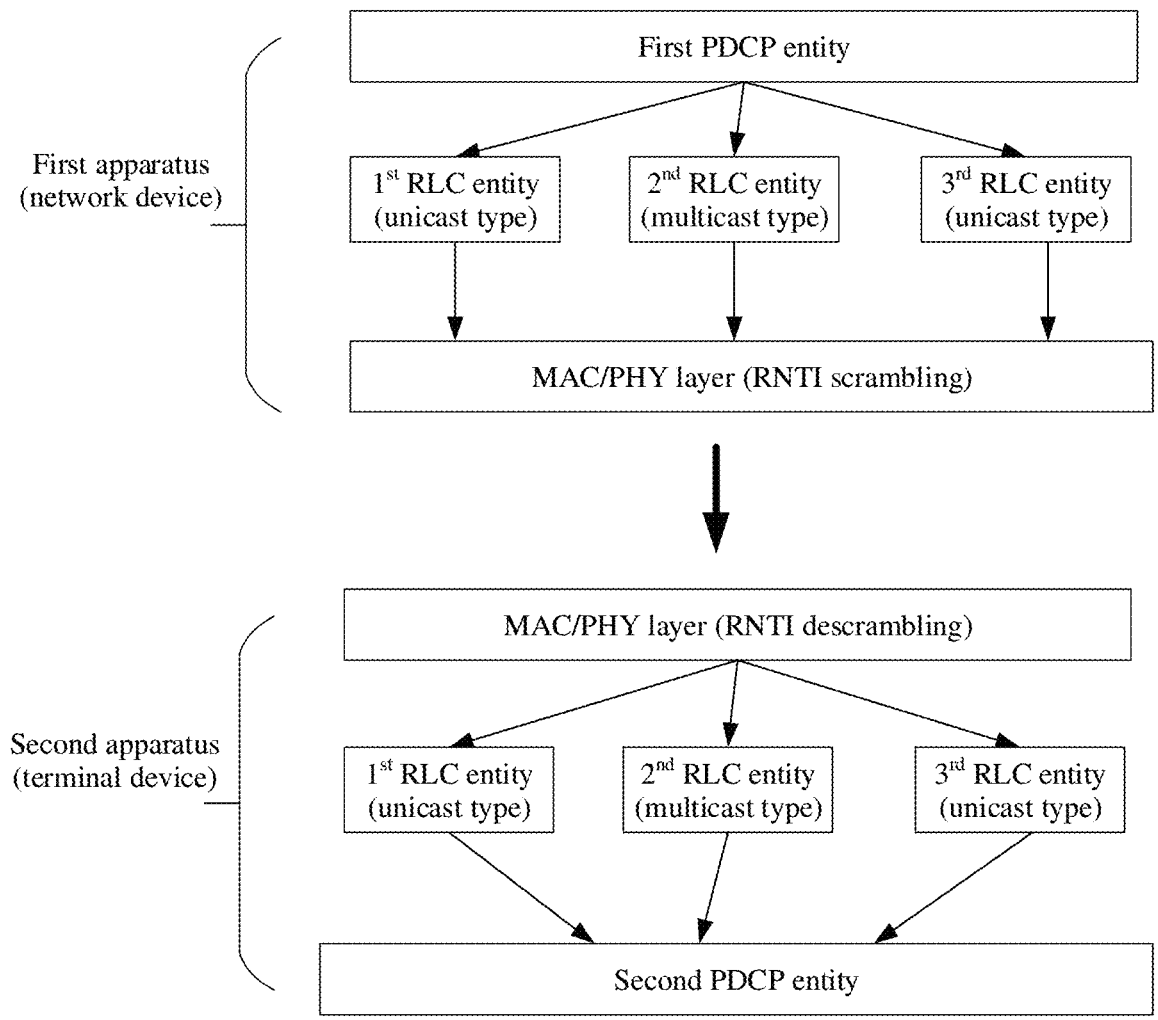
FIG. 4 is a schematic diagram of protocol stack architectures of a first apparatus and a second apparatus according to an embodiment of this application.

FIG. 4 is a schematic diagram of protocol stack architectures of a first apparatus and a second apparatus according to an embodiment of this application. As shown in FIG. 4, a first PDCP entity of the first apparatus (a network device) is associated with three RLC entities, where the $1^{st}$ RLC entity and the $3^{rd}$ RLC entity are of a unicast type, and the $2^{nd}$ RLC entity is of a multicast type. A second PDCP entity of the second apparatus (a terminal device) is also associated with three RLC entities, where the $1^{st}$ RLC entity and the $3^{rd}$ RLC entity are of the unicast type, and the $2^{nd}$ RLC entity is of the multicast type. When the first apparatus sends data to the second apparatus, the following three data transmission modes may be used.

Mode 1: Only a unicast transmission mode is used (only a first RLC entity is used). To be specific, data of the first PDCP entity is delivered to the first RLC entity (where the first RLC entity is the $1^{st}$ RLC entity of the network device, or the $3^{rd}$ RLC entity of the network device, or the $1^{st}$ RLC entity and the $3^{rd}$ RLC entity of the network device), and the data on a logical channel corresponding to the first RLC entity is sent, in the unicast mode, to the terminal device for receiving. Specifically, after packet assembly is performed on the data at a MAC layer, the data is delivered to a physical layer. The data is scrambled at the physical layer by using a radio network temporary identifier (RNTI) corresponding to the first RLC entity and sent to the terminal device. The terminal device receives the data based on an allocated or predefined RNTI corresponding to the first RLC entity, and delivers the data received in the unicast transmission mode to a third RLC entity (where the third RLC entity is the $1^{st}$ RLC entity of the terminal device, or the $3^{rd}$ RLC entity of the terminal device, or the $1^{st}$ RLC entity and the $3^{rd}$ RLC entity of the terminal device).

Mode 2: Only a multicast transmission mode is used (only a second RLC entity is used). To be specific, data of the first PDCP entity is delivered to the second RLC entity (where the second RLC entity is the $2^{nd}$ RLC entity of the network device), and the data on a logical channel corresponding to the second RLC entity is sent, in the multicast mode, to a plurality of apparatuses for receiving. The plurality of apparatuses include the terminal device. Specifically, after packet assembly is performed on the data at a MAC layer, the data is delivered to a physical layer. The data is scrambled at the physical layer by using an RNTI corresponding to the second RLC entity and sent to the plurality of apparatuses for receiving. The terminal device receives the data based on an allocated or predefined RNTI corresponding to the second RLC entity, and delivers the data received in the multicast transmission mode to a fourth RLC entity (where the fourth RLC entity is the $2^{nd}$ RLC entity of the terminal device).

Mode 3: A unicast transmission mode and a multicast transmission mode are used (a first RLC entity and a second RLC entity are used). To be specific, data of the first PDCP entity is delivered to the first RLC entity and the second RLC entity (the $1^{st}$ to $3^{rd}$ RLC entities of the network device). The data on a logical channel corresponding to the first RLC entity is sent, in the unicast mode, to the terminal device for receiving, and the data on a logical channel corresponding to the second RLC entity is sent, in the multicast mode, to a plurality of apparatuses for receiving. The plurality of apparatuses include the terminal device. Specifically, when packet assembly is performed at a MAC layer, the data on the logical channel corresponding to the first RLC entity and the data on the logical channel corresponding to the second RLC entity are not multiplexed into a same data packet because different processing needs to be performed subsequently. The data on the unicast logical channel is processed at the MAC layer and delivered to a physical layer. The data is scrambled at the physical layer by using an RNTI corresponding to the first RLC entity and sent. The data on the multicast logical channel is processed at the MAC layer and delivered to the physical layer. The data is scrambled at the physical layer by using an RNTI corresponding to the second RLC entity and sent. The terminal device may attempt to receive the data on the unicast logical channel and the data on the multicast logical channel respectively by using an allocated or predefined RNTI corresponding to the first RLC entity and an allocated or predefined RNTI corresponding to the second RLC entity.

It should be understood that FIG. 4 is merely an example, should not constitute a limitation on a quantity of multicast RLC entities and a quantity of unicast RLC entities in the embodiments of this application, and should not constitute any limitation on protocol stack structures of the first apparatus and the second apparatus.

Figure 5:
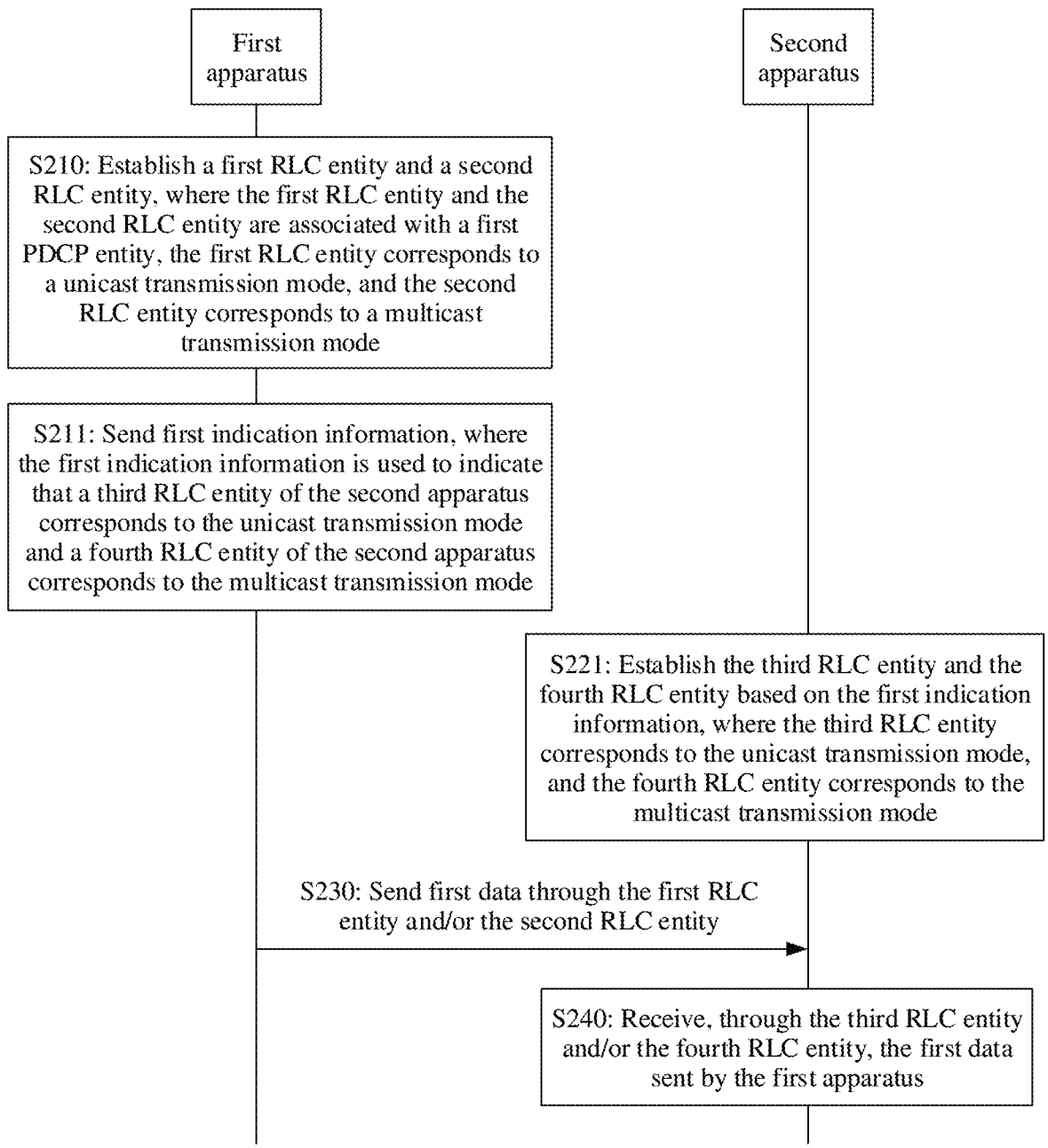
FIG. 5 is a schematic interaction diagram of another communication method according to an embodiment of this application.

FIG. 5 is a schematic flowchart of a communication method in some embodiments of this application. Optionally, in some possible implementations of this application, as shown in FIG. 5, the method 200 further includes S211 based on the steps in the method shown in FIG. 3.

S211: The first apparatus sends first indication information to the second apparatus, where the first indication information is used to indicate that the third RLC entity of the second apparatus corresponds to the unicast transmission mode and the fourth RLC entity of the second apparatus corresponds to the multicast transmission mode.

That the second apparatus establishes the third RLC entity and the fourth RLC entity in S220 includes:

S221: The second apparatus establishes the third RLC entity and the fourth RLC entity based on the first indication information.

For steps S210, S230, and S240 shown in FIG. 5, refer to the foregoing related descriptions of S210, S230, and S240. For brevity, details are not described herein again.

In S211, the first apparatus may configure types of the plurality of RLC entities for the second apparatus. For example, the first apparatus may send the first indication information to the second apparatus, where the first indication information is used to indicate that the third RLC entity of the second apparatus corresponds to the unicast transmission mode and the fourth RLC entity of the second apparatus corresponds to the multicast transmission mode. That is, the first apparatus indicates, to the second apparatus by using the first indication information, a type of each of the plurality of RLC entities of the second apparatus. The type of the RLC entity (or a type of a logical channel corresponding to the RLC entity) may be the unicast type or the multicast type. Data received in an RLC entity of the unicast type is received in the unicast mode, and data received in an RLC entity of the multicast type is received in the multicast mode. In S221, after receiving the first indication information, the second apparatus may determine, in the plurality of RLC entities of the second apparatus based on the first indication information, a specific RLC entity or specific RLC entities that are RLC entities of the multicast type (the fourth RLC entity) and a specific RLC entity or specific RLC entities that are RLC entities of the unicast type (the third RLC entity), and further establish the third RLC entity and the fourth RLC entity.

The first apparatus notifies the second apparatus of the type of each of the plurality of RLC entities, so that the second apparatus establishes the third RLC entity and the fourth RLC entity. This can improve accuracy and efficiency of establishing the third RLC entity and the fourth RLC entity by the second apparatus, thereby facilitating implementation and achieving low complexity.

For the first indication information, in a possible implementation, the first indication information is used to indicate a type of the third RLC entity and a type of the fourth RLC entity.

Specifically, whether an RLC entity corresponds to the unicast transmission mode or the multicast transmission mode may be indicated by indicating the type of each of the plurality of RLC entities of the second apparatus. A type of an RLC entity may also be referred to as a type of a logical channel corresponding to the RLC entity. For example, if it indicates that a type of a specific RLC entity is the unicast type, the RLC entity corresponds to the unicast transmission mode and is the third RLC entity. If it indicates that a type of a specific RLC entity is the multicast type, the RLC entity corresponds to the multicast transmission mode and is the fourth RLC entity. The type of each RLC entity is indicated to the second apparatus, so that the second apparatus determines the third RLC entity (corresponding to the unicast transmission mode) and the fourth RLC entity (corresponding to the multicast transmission mode). This can improve efficiency and accuracy of determining the third RLC entity and the fourth RLC entity by the second apparatus, thereby facilitating implementation.

For the first indication information, in another possible implementation, the first indication information includes radio network temporary identifier RNTI type information corresponding to the third RLC entity and RNTI type information corresponding to the fourth RLC entity.

Specifically, in addition to the foregoing manner in which the type of each RLC entity is directly indicated, the RNTI type information corresponding to the third RLC entity and the RNTI type information corresponding to the fourth RLC entity may alternatively be indicated. Specifically, each RLC entity may have a binding relationship or a correspondence with an RNTI. Different types of RNTIs correspond to different types of RNTI entities. For example, if an RNTI corresponding to (bound to) a specific RLC entity is a first RNTI, and the first RNTI corresponds to the unicast transmission mode, the RLC entity corresponds to the unicast transmission mode and is the third RLC entity. The second apparatus receives data scrambled by using the first RNTI, and delivers the data to the third RLC entity. If an RNTI corresponding to (bound to) a specific RLC entity is a second RNTI, and the second RNTI corresponds to the multicast transmission mode, the RLC entity corresponds to the multicast transmission mode and is the fourth RLC entity. The second apparatus receives data scrambled by using the second RNTI, and delivers the data to the fourth RLC entity. If the third RLC entity and the fourth RLC entity each include a plurality of RLC entities, the second apparatus may first select an RLC entity type based on a type of a bound RNTI, and then select, in the third RLC entity or the fourth RLC entity based on a logical channel number carried in received data, a specific RLC entity to which the data is delivered. Each RLC entity may correspond to one logical channel number (or may also be referred to as one logical channel number). An RNTI type corresponding to each RLC entity is indicated to the second apparatus, and a corresponding transmission mode is determined based on the RNTI type. This facilitates implementation.

It should be understood that, for the first apparatus, data may also be scrambled by using an RNTI corresponding to the first RLC entity. For example, data transmitted through the first RLC entity is scrambled at a physical layer by using the first RNTI and sent to the second apparatus. Data transmitted through the second RLC entity is scrambled at the physical layer by using the second RNTI and sent to the second apparatus.

In a possible implementation, an RNTI type corresponding to the first RLC entity and an RNTI type corresponding to the third RLC entity may be both a cell radio network temporary identifier (C-RNTI), and an RNTI type corresponding to the second RLC entity and an RNTI type corresponding to the fourth RLC entity may be both a group radio network temporary identifier (G-RNTI). The first apparatus may scramble data from the first RLC entity at the physical layer by using a C-RNTI and send the data to the second apparatus, and scramble data from the second RLC entity at the physical layer by using a G-RNTI and send the data to the second apparatus. Specifically, the data from the first RLC entity is first delivered to a MAC layer to form a media access control protocol data unit (MAC PDU), and then the MAC PDU is delivered to the physical layer for processing to form a transport block (TB). Then, the first apparatus scrambles the transport block (TB) including the data in the first RLC entity by using the C-RNTI, and sends the scrambled transport block to the second apparatus. In addition, the first apparatus may further scramble downlink control information (DCI) corresponding to the transport block by using the C-RNTI, and send the scrambled DCI to the second apparatus. Similarly, the data from the second RLC entity is first delivered to the MAC layer to form a MAC PDU, and then the MAC PDU is delivered to the physical layer for processing to form a transport block (TB). Then, the first apparatus scrambles the transport block (TB) including the data in the second RLC entity by using the G-RNTI, and sends the scrambled transport block to the second apparatus. In addition, the first apparatus may further scramble downlink control information (DCI) corresponding to the transport block by using the G-RNTI, and send the scrambled DCI to the second apparatus.

It should be understood that in this embodiment of this application, RNTIs corresponding to the first RLC entity and the third RLC entity may be RNTIs of another type, and this type of RNTI is used to scramble data transmitted in the unicast transmission mode. RNTIs corresponding to the second RLC entity and the fourth RLC entity may also be RNTIs of another type, and this type of RNTI is used to scramble data transmitted in the multicast transmission mode. This is not limited in this application.

FIG. 3 is a schematic flowchart of a communication method in some embodiments of this application. Optionally, in some possible implementations of this application, as shown in FIG. 6, the method 200 further includes S231 based on the steps in the method shown in FIG. 3.

S231: The first apparatus sends second indication information to the second apparatus, where the second indication information is used to indicate a first radio bearer and a first transmission mode corresponding to the first radio bearer, and the first radio bearer includes the first PDCP entity.

The first transmission mode is the unicast transmission mode, the multicast transmission mode, or the unicast transmission mode and the multicast transmission mode.

Figure 6:
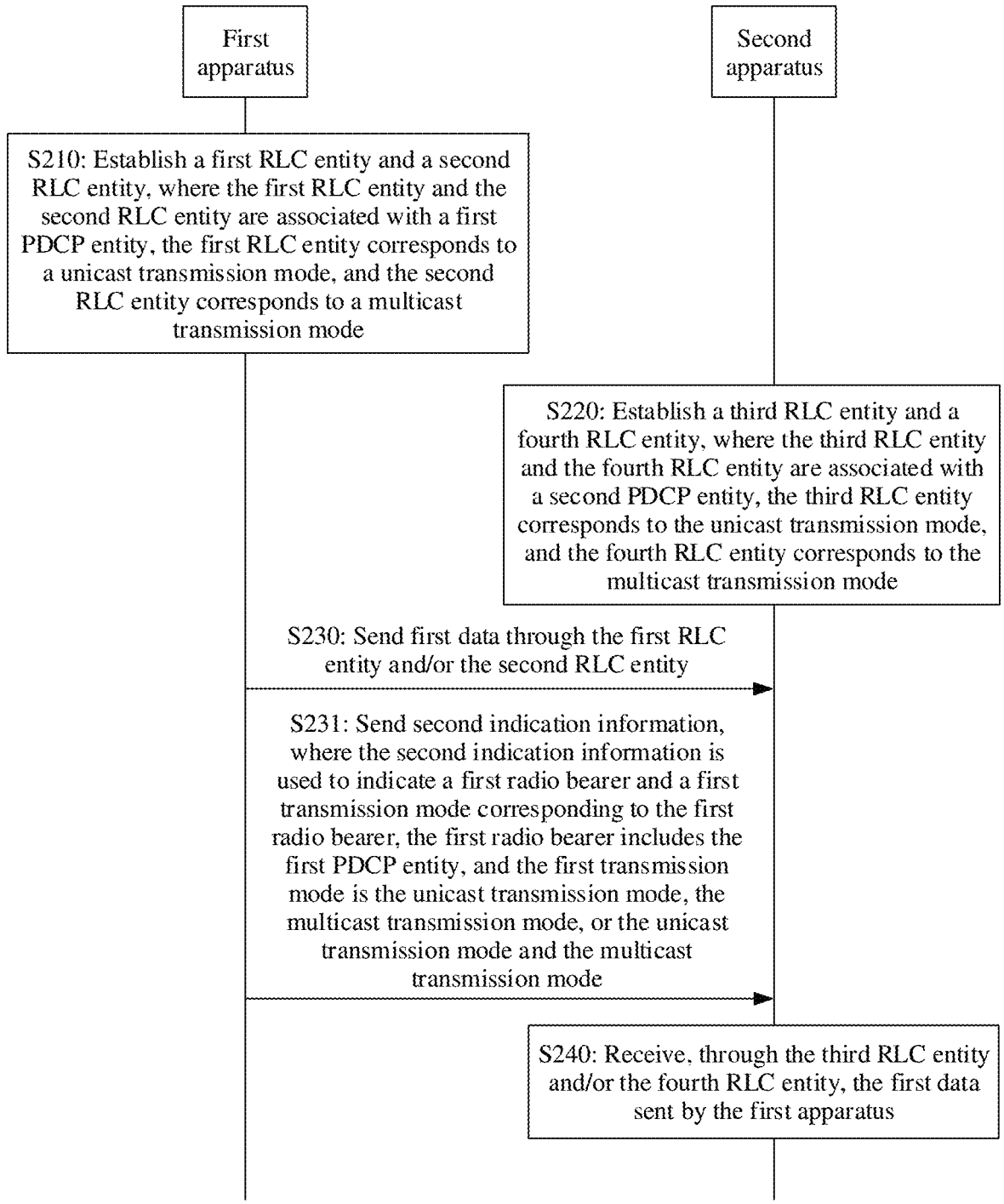
FIG. 6 is a schematic interaction diagram of another communication method according to an embodiment of this application.

For steps S210, S220, S230, and S240 shown in FIG. 6, refer to the foregoing related descriptions of S210, S220, S230, and S240. For brevity, details are not described herein again.

In S231, because the first apparatus may use an unused data transmission mode when sending the data, the first apparatus may send the second indication information to the second apparatus, where the second indication information is used to indicate the first radio bearer and the first transmission mode corresponding to the first radio bearer. That is, a transmission mode used by the first apparatus to send data is indicated to the second apparatus. The first radio bearer may include the first PDCP entity and RLC entities (the first RLC entity and the second RLC entity) associated with the first PDCP entity, and the second PDCP entity and RLC entities (the third RLC entity and the fourth RLC entity) associated with the second PDCP entity. Alternatively, configuration information of the first radio bearer is associated with configuration information of the second PDCP entity and configuration information of the RLC entities associated with the second PDCP entity. Association may mean that the foregoing different pieces of configuration information include a same identifier, and the identifier may be a radio bearer identifier. Because a plurality of radio bearers may exist between the first apparatus and the second apparatus, transmission modes corresponding to the radio bearers may be different. For example, a radio bearer 1 uses the unicast transmission mode, and a radio bearer 2 uses the multicast transmission mode. Therefore, the second indication information first needs to indicate a specific radio bearer or specific radio bearers to which the second indication information is specific. Assuming that the second indication information is specific to the first radio bearer, a data transmission mode, between the first apparatus and the second apparatus, corresponding to the first radio bearer is indicated, that is, a data transmission mode (the first transmission mode) corresponding to the first bearer is determined. For example, the second indication information may include a radio bearer identifier, used to indicate the first radio bearer. Alternatively, the second indication information includes a bitmap (bitmap), and the radio bearer is implicitly indicated by using a correspondence between a location of each bit included in the bitmap and a radio bearer. For a data transmission mode corresponding to each radio bearer, for example, values 0 and 1 of a bit indicate different transmission modes. After receiving the second indication information, the second apparatus may receive the data through a corresponding RLC entity based on the transmission mode.

The first transmission mode includes the unicast transmission mode, the multicast transmission mode, or the unicast transmission mode and the multicast transmission mode. The unicast transmission mode may be understood as that the first apparatus sends the data through only the first RLC entity, and the second apparatus receives the data through only the third RLC entity. The multicast transmission mode may be understood as that the first apparatus sends the data through only the second RLC entity, and the second apparatus receives the data through only the fourth RLC entity. The unicast transmission mode and the multicast transmission mode may be understood as that the first apparatus sends the data through the first RLC entity and the second RLC entity, and the second apparatus receives the data through the third RLC entity and the fourth RLC entity.

The first apparatus sends, to the second apparatus, the second indication information indicating the transmission mode, so that switching between transmission modes used for transmission between the first apparatus and the second apparatus can be quickly and flexibly implemented, and signaling overheads for indicating transmission mode switching can be reduced. In addition, the second apparatus may adjust a data receiving mode based on the indication information, so that the second apparatus can receive the data more accurately. This improves reliability of data transmission, and reduces a waste of resources of the second apparatus.

It should be understood that the second indication information may further indicate a second radio bearer and a second transmission mode used for the second radio bearer. The second transmission mode includes the unicast transmission mode, the multicast transmission mode, or the unicast transmission mode and the multicast transmission mode. That is, the second indication information may indicate a plurality of radio bearers and a transmission mode used for each bearer. This is not limited in this embodiment of this application.

It should be further understood that the method shown in FIG. 6 may also include S211 and S221.

It should be further understood that the method shown in FIG. 5 may also include S231.

The first indication information or the second indication information may be carried in media access control control element (MAC CE) signaling, radio resource control (RRC) signaling, RLC signaling, or downlink control information (DCI). It should be understood that the first indication information or the second indication information may alternatively be carried in other signaling sent by the first apparatus to the second apparatus. Specific transmission modes of the first indication information and the second indication information are not limited in the embodiments of this application.

In some embodiments of this application, when the first apparatus transmits the first data in only the unicast transmission mode, the second apparatus stops monitoring a first RNTI, where the first RNTI is used to receive data transmitted in the first radio bearer in the multicast transmission mode.

An example in which the first RNTI is a G-RNTI and the unicast transmission mode corresponds to a C-RNTI is used for description. If the first data is transmitted only in the unicast transmission mode, that is, the first apparatus sends the first data to the second apparatus through only the first RLC entity, and does not send the first data to the second apparatus through the second RLC entity, the second apparatus receives, through only the third RLC entity, the first data sent by the first apparatus, and the second apparatus does not receive, through the fourth RLC entity, the first data sent by the first apparatus. In this case, the data sent by the first apparatus through the first RLC entity is scrambled at the physical layer by using the C-RNTI and sent to the second apparatus. The second apparatus only needs to monitor the C-RNTI to perform data descrambling. Because there is no data scrambled by using the G-RNTI, the second apparatus may not monitor (or stop monitoring) the G-RNTI. In this way, resource consumption of the second apparatus can be reduced. For example, the second apparatus may be enabled to be more power-saving, and use time of the second apparatus may be prolonged.

Figure 7:
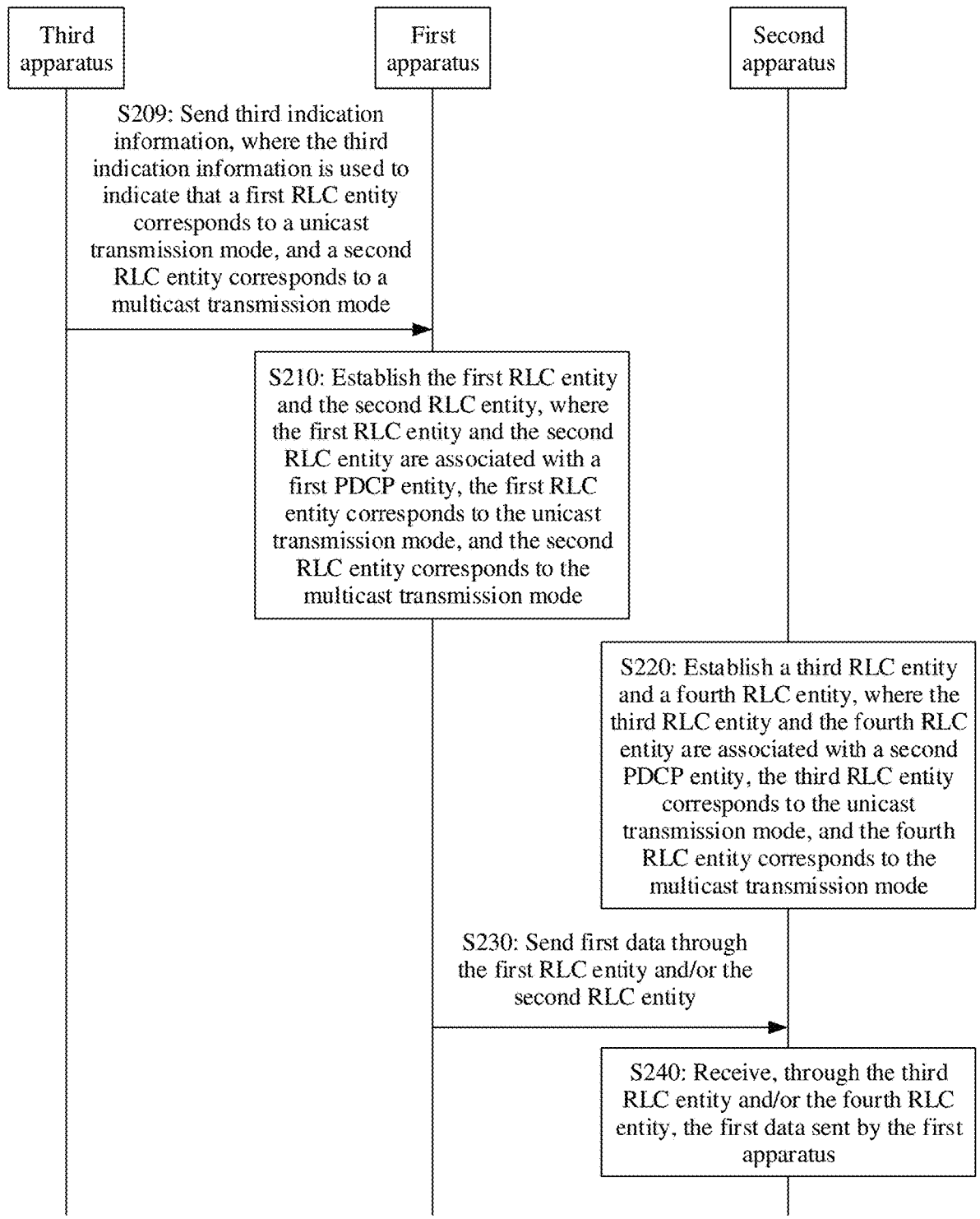
FIG. 7 is a schematic interaction diagram of still another communication method according to an embodiment of this application.

In some embodiments of this application, if the access network device is in a CU-DU separation architecture, the first apparatus may be a DU, and a third apparatus may be a DU. For example, a PDCP layer entity and a protocol layer entity above the PDCP layer entity may be disposed in the CU, and an RLC layer entity and a protocol layer entity below the RLC layer entity may be disposed in the DU. FIG. 7 is a schematic flowchart of a communication method in some embodiments of this application. As shown in FIG. 7, the method 200 further includes S209 based on the steps in the method shown in FIG. 3.

S209: The third apparatus sends third indication information to the first apparatus, where the third indication information is used to indicate that the first RLC entity corresponds to the unicast transmission mode, and the second RLC entity corresponds to the multicast transmission mode.

Specifically, in a CU-DU separation scenario, for example, functions of a PDCP layer and a layer above the PDCP layer are set on the CU, and functions of protocol layers below the PDCP layer, such as an RLC layer and the MAC layer, are set on the DU. The CU needs to indicate a type of each of a plurality of RLC entities of the DU (a type of a logical channel corresponding to the RLC entity). The type of the RLC entity may be the unicast type or the multicast type. Data in an RLC entity of the unicast type (the first RLC entity) is sent in the unicast mode, and data in an RLC entity of the multicast type (the second RLC entity) is sent in the multicast mode. The third apparatus (CU) notifies the first apparatus (DU) of the type of each of the plurality of RLC entities, so that the first apparatus establishes the first RLC entity and the second RLC entity. This can improve accuracy and efficiency of establishing the first RLC entity and the second RLC entity by the first apparatus, thereby facilitating implementation and achieving low complexity.

For the third indication information, in a possible implementation, the third indication information is used to indicate a type of the first RLC entity and a type of the second RLC entity. In another possible implementation, the third indication information includes RNTI type information corresponding to the first RLC entity and RNTI type information corresponding to the second RLC entity. For example, an RNTI type corresponding to the first RLC entity is a C-RNTI, and an RNTI type corresponding to the second RLC entity is a G-RNTI. The third indication information is similar to the second indication information. For descriptions of the third indication information, refer to the foregoing descriptions of the second indication information. For brevity, details are not described herein again.

It should be understood that in the CU-DU separation architecture, the first apparatus may be the DU, and the third apparatus may be the DU. In this case, the third apparatus may further send indication information to the first apparatus, to indicate the first radio bearer and the first transmission mode corresponding to the first radio bearer. The first transmission mode is the unicast transmission mode, the multicast transmission mode, or the unicast transmission mode and the multicast transmission mode. That is, a transmission mode used when the first apparatus sends the data to the second apparatus is indicated. The unicast transmission mode may be understood as that the first apparatus sends the data through only the first RLC entity. The multicast transmission mode may be understood as that the first apparatus sends the data through only the second RLC entity. The unicast transmission mode and the multicast transmission mode may be understood as that the first apparatus sends the data through the first RLC entity and the second RLC entity. Therefore, flexible switching between transmission modes of the first apparatus can be implemented.

It should be further understood that, in addition to notifying the second apparatus of the first radio bearer and the first transmission mode corresponding to the first radio bearer by using the indication information, the third apparatus may alternatively implicitly notify the second apparatus of the first radio bearer and the first transmission mode. For example, that the third apparatus delivers a data packet to a unicast logical channel in the first apparatus indicates the unicast transmission mode, that the third apparatus delivers a data packet to both a unicast logical channel and a multicast logical channel in the first apparatus indicates the unicast transmission mode and the multicast transmission mode, and that the third apparatus delivers a data packet to a multicast logical channel in the first apparatus indicates the multicast transmission mode.

It should be understood that the method shown in FIG. 5 or FIG. 6 may also include S209.

According to the communication method provided in this application, one PDCP is configured to be associated with a plurality of RLC entities, and the plurality of RLC entities include an RLC entity corresponding to the unicast transmission mode and an RLC entity corresponding to the multicast transmission mode. During data transmission, data is transmitted through the RLC entity corresponding to the unicast transmission mode and/or the RLC entity corresponding to the multicast transmission mode. In this way, flexible switching can be performed between the unicast transmission mode and the multicast transmission mode, and a reconfiguration process does not need to be performed. Therefore, signaling overheads and a delay during the transmission mode switching can be reduced, and reliability of the data transmission can be improved.

It should be understood that in the embodiments of this application, "first", "second", and the like are merely for ease of description. For example, "the first RLC entity" and "the second RLC entity" are merely intended to indicate different RLC entities, but should not cause any impact on the RLC entities and a quantity of RLC entities. The foregoing "first", "second", and the like should not cause any limitation on the embodiments of this application.

It should be further understood that, the foregoing descriptions are merely intended to help a person skilled in the art better understand the embodiments of this application, instead of limiting the scope of the embodiments of this application. It is clear that a person skilled in the art may make various equivalent modifications or changes based on the foregoing examples. For example, some steps in the embodiments of the foregoing method may not be required, or some steps may be added. Alternatively, any two or more of the foregoing embodiments are combined. A modified, changed, or combined solution also falls within the scope of the embodiments of this application.

It should be further understood that the foregoing descriptions of the embodiments of this application emphasize differences between the embodiments. For same or similar parts that are not mentioned, refer to the embodiments. For brevity, details are not described herein again.

It should be further understood that sequence numbers of the processes do not mean execution sequences of the processes. The execution sequences of the processes should be determined based on functions and internal logic of the processes, and should not be construed as any limitation on the implementation processes of the embodiments of this application.

It should be further understood that in the embodiments of this application, "presetting" and "predefinition" may be implemented by prestoring corresponding code or a corresponding table in a device (including, for example, a terminal or a network device) or in another manner that can be used to indicate related information. A specific implementation is not limited in this application.

It should be further understood that the division of the manners, cases, categories, and embodiments in the embodiments of this application is merely intended for ease of description, and should not constitute a particular limitation. The features in the manners, categories, cases, and embodiments may be combined without contradiction.

It should be further understood that in the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

The foregoing describes in detail the communication methods in the embodiments of this application with reference to FIG. 1 to FIG. 7. The following describes in detail communication apparatuses in the embodiments of this application with reference to FIG. 8 to FIG. 13.

Figure 8:
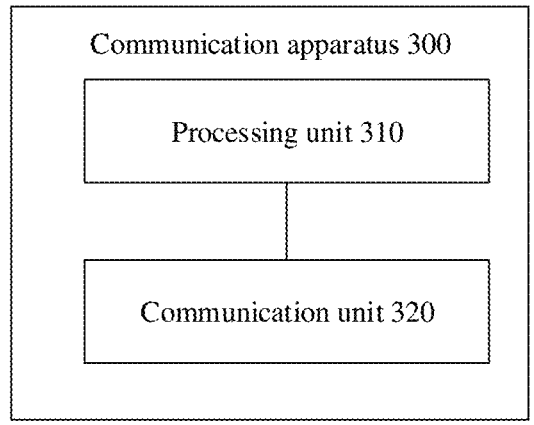
FIG. 8 is a schematic diagram of a communication apparatus according to an embodiment of this application.

FIG. 8 is a schematic block diagram of a communication apparatus 300 according to an embodiment of this application. The communication apparatus 300 may correspond to the first apparatus described in the method 200, or may be a chip or a component used in the first apparatus. In addition, modules or units in the communication apparatus 300 are separately configured to perform actions or processing processes performed by the first apparatus in the method 200. As shown in FIG. 8, the communication apparatus 300 may include a processing unit 310 and a communication unit 320.

The processing unit 310 is configured to establish a first RLC entity and a second RLC entity, where the first RLC entity and the second RLC entity are associated with a first PDCP entity.

The communication unit 320 is configured to send first data through the first RLC entity and/or the second RLC entity.

The first RLC entity corresponds to a unicast transmission mode, and the second RLC entity corresponds to a multicast transmission mode.

According to the communication apparatus provided in this application, when the communication apparatus needs to perform transmission mode switching, a configuration of the original unicast transmission mode or the original multicast transmission mode does not need to be released, flexible switching between different transmission modes can be completed only by stopping using the unicast transmission mode or the multicast transmission mode, and there is no need to perform a reconfiguration process. Therefore, signaling overheads and a delay during the transmission mode switching are reduced. In addition, when both the unicast transmission mode and the multicast transmission mode are used, same data may be repeatedly sent in different transmission modes. Therefore, reliability of data transmission can be improved.

Optionally, in some embodiments of this application, the communication unit 320 is further configured to: send first indication information to a second apparatus, where the first indication information is used to indicate that a third RLC entity of the second apparatus corresponds to the unicast transmission mode and a fourth RLC entity of the second apparatus corresponds to the multicast transmission mode, and the third RLC entity and the fourth RLC entity are associated with a second PDCP entity.

Optionally, in some embodiments of this application, the first indication information is used to indicate a type of the third RLC entity and a type of the fourth RLC entity. Alternatively, the first indication information includes radio network temporary identifier RNTI type information corresponding to the third RLC entity and RNTI type information corresponding to the fourth RLC entity.

Optionally, in some embodiments of this application, an RNTI type corresponding to the third RLC entity is a cell radio network temporary identifier C-RNTI, and an RNTI type corresponding to the fourth RLC entity is a group radio network temporary identifier G-RNTI.

Optionally, in some embodiments of this application, the communication unit 320 is further configured to: send second indication information to the second apparatus, where the second indication information is used to indicate a first radio bearer and a first transmission mode corresponding to the first radio bearer, and the first radio bearer includes the first PDCP entity. The first transmission mode is the unicast transmission mode, the multicast transmission mode, or the unicast transmission mode and the multicast transmission mode.

Optionally, in some embodiments of this application, the communication unit 320 is further configured to: receive third indication information from a third apparatus, where the third indication information is used to indicate that the first RLC entity corresponds to the unicast transmission mode and the second RLC entity corresponds to the multicast transmission mode.

Optionally, in some embodiments of this application, the third indication information is used to indicate a type of the first RLC entity and a type of the second RLC entity; or the third indication information includes RNTI type information corresponding to the first RLC entity and RNTI type information corresponding to the second RLC entity.

Optionally, in some embodiments of this application, an RNTI type corresponding to the first RLC entity is a cell radio network temporary identifier C-RNTI, and an RNTI type corresponding to the second RLC entity is a group radio network temporary identifier G-RNTI.

Optionally, in some embodiments of this application, the processing unit 310 is further configured to: scramble data from the first RLC entity by using a cell radio network temporary identifier C-RNTI; and/or scramble a transport block TB of data from the second RLC entity by using a group radio network temporary identifier G-RNTI.

It should be understood that for a specific process in which the units in the communication apparatus 300 perform the foregoing corresponding steps, refer to the foregoing descriptions related to the first apparatus with reference to the embodiments shown in FIG. 3, FIG. 5, FIG. 6, and FIG. 7 and the embodiments related to the method 200. For brevity, details are not described herein again.

Optionally, the communication unit 320 may include a receiving unit (module) and a sending unit (module), which are configured to perform the steps of receiving and sending information by the first apparatus in the embodiments of the method 200 and the embodiments shown in FIG. 3, FIG. 5, FIG. 6, and FIG. 7. Optionally, the communication apparatus 300 may further include a storage unit 330, configured to store instructions executed by the processing unit 310 and the communication unit 320. The processing unit 310, the communication unit 320, and the storage unit 330 are in communication connection. The storage unit 330 stores the instructions. The processing unit 310 is configured to execute the instructions stored in the storage unit 330. The communication unit 320 is configured to send or receive a specific signal under driving of the processing unit 310.

Figure 9:
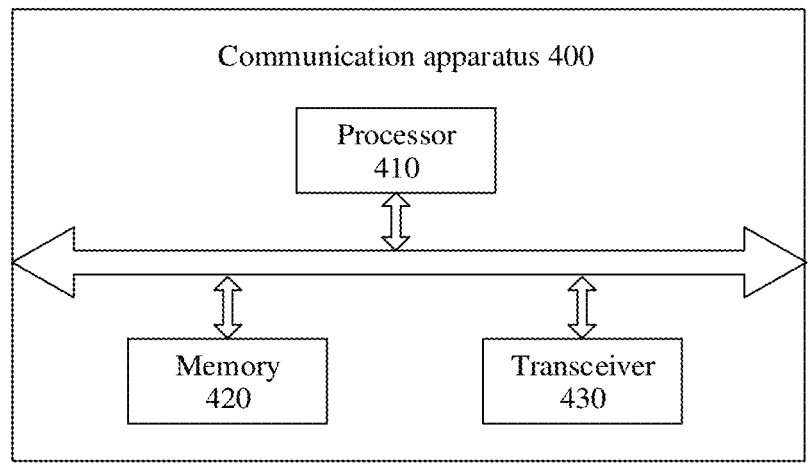
FIG. 9 is a schematic diagram of another communication apparatus according to an embodiment of this application.

It should be understood that the communication unit 320 may be a transceiver, an input/output interface, or an interface circuit. The storage unit 330 may be a memory. The processing unit 310 may be implemented by a processor. As shown in FIG. 9, a communication apparatus 400 may include a processor 410, a memory 420, and a transceiver 430.

The communication apparatus 300 shown in FIG. 8 or the communication apparatus 400 shown in FIG. 9 can implement the steps performed by the first apparatus in the embodiments of the method 200 and the embodiments shown in FIG. 3, FIG. 5, FIG. 6, and FIG. 7. For similar descriptions, refer to the descriptions in the foregoing corresponding methods. To avoid repetition, details are not described herein again.

The communication apparatus 300 shown in FIG. 8 or the communication apparatus 400 shown in FIG. 9 may be a network device, or may be a DU in a CU-DU separation scenario, and the foregoing third apparatus is a CU.

Figure 10:
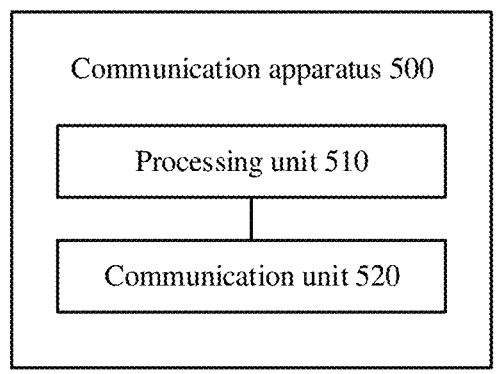
FIG. 10 is a schematic diagram of a communication apparatus according to an embodiment of this application.

FIG. 10 is a schematic block diagram of a communication apparatus 500 according to an embodiment of this application. The communication apparatus 500 may correspond to the second apparatus described in the method 200, or may be a chip or a component used in the second apparatus. In addition, modules or units in the communication apparatus 500 are separately configured to perform actions or processing processes performed by the second apparatus in the method 200. As shown in FIG. 10, the communication apparatus 500 may include a processing unit 510 and a communication unit 520.

The processing unit 510 is configured to establish a third RLC entity and a fourth RLC entity, where the third RLC entity and the fourth RLC entity are associated with a second PDCP entity.

The communication unit 520 is configured to receive first data through the third RLC entity and/or the fourth RLC entity.

The third RLC entity corresponds to a unicast transmission mode, and the fourth RLC entity corresponds to a multicast transmission mode.

According to the communication apparatus provided in this application, when transmission mode switching needs to be performed, flexible switching between different transmission modes can be completed only by stopping using the unicast transmission mode or the multicast transmission mode, and there is no need to perform a reconfiguration process. Therefore, signaling overheads and a delay during the transmission mode switching are reduced. When both the unicast transmission mode and the multicast transmission mode are used, same data may be repeatedly received in different transmission modes. Therefore, reliability of data receiving can be improved.

Optionally, in some embodiments of this application, the communication unit 520 is further configured to receive first indication information, where the first indication information is used to indicate that the third RLC entity corresponds to the unicast transmission mode and the fourth RLC entity corresponds to the multicast transmission mode; and the processing unit 510 is configured to establish the third RLC entity and the fourth RLC entity based on the first indication information.

Optionally, in some embodiments of this application, the first indication information is used to indicate a type of the third RLC entity and a type of the fourth RLC entity. Alternatively, the first indication information includes radio network temporary identifier RNTI type information corresponding to the third RLC entity and RNTI type information corresponding to the fourth RLC entity.

Optionally, in some embodiments of this application, an RNTI type corresponding to the third RLC entity is a cell radio network temporary identifier C-RNTI, and an RNTI type corresponding to the fourth RLC entity is a group radio network temporary identifier G-RNTI.

Optionally, in some embodiments of this application, the communication unit 520 is further configured to: receive second indication information, where the second indication information is used to indicate a first radio bearer and a first transmission mode corresponding to the first radio bearer, and the first radio bearer includes the second PDCP entity. The first transmission mode is the unicast transmission mode, the multicast transmission mode, or the unicast transmission mode and the multicast transmission mode.

Optionally, in some embodiments of this application, when the communication unit 520 receives the first data through only the third RLC entity, the processing unit 510 is further configured to stop monitoring a first RNTI, where the first RNTI is used to receive data transmitted in the first radio bearer in the multicast transmission mode, and the first radio bearer includes the second PDCP entity.

Optionally, in some embodiments of this application, the processing unit 510 is further configured to: deliver the received first data scrambled by using a cell radio network temporary identifier C-RNTI to the third RLC entity; and/or delivers the received first data scrambled by using a group radio network temporary identifier G-RNTI to the fourth RLC entity.

It should be understood that for a specific process in which the units in the communication apparatus 500 perform the foregoing corresponding steps, refer to the foregoing descriptions related to the second apparatus with reference to the embodiments shown in FIG. 3, FIG. 5, FIG. 6, and FIG. 7 and the embodiments related to the method 200. For brevity, details are not described herein again.

Optionally, the communication unit 520 may include a receiving unit (module) and a sending unit (module), which are configured to perform the steps of receiving and sending information by the second apparatus in the embodiments of the method 200 and the embodiments shown in FIG. 3, FIG. 5, FIG. 6, and FIG. 7. Optionally, the communication apparatus 500 may further include a storage unit 530, configured to store instructions executed by the processing unit 510 and the communication unit 520. The processing unit 510, the communication unit 520, and the storage unit 530 are in communication connection. The storage unit 530 stores the instructions. The processing unit 510 is configured to execute the instructions stored in the storage unit 530. The communication unit 520 is configured to send or receive a specific signal under driving of the processing unit 510.

Figure 11:
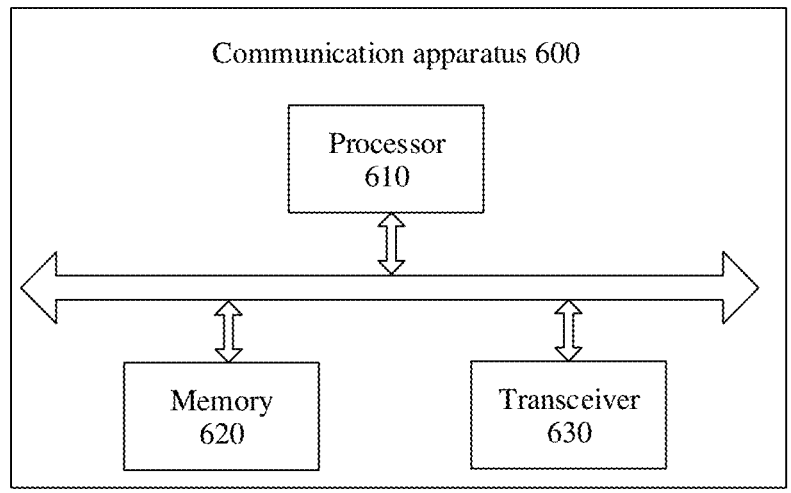
FIG. 11 is a schematic diagram of another communication apparatus according to an embodiment of this application.

It should be understood that the communication unit 520 may be a transceiver, an input/output interface, or an interface circuit. The storage unit 530 may be a memory. The processing unit 510 may be implemented by a processor. As shown in FIG. 11, a communication apparatus 600 may include a processor 610, a memory 620, and a transceiver 630.

The communication apparatus 500 shown in FIG. 10 or the communication apparatus 600 shown in FIG. 11 can implement the steps performed by the second apparatus in the embodiments of the method 200 and the embodiments shown in FIG. 3, FIG. 5, FIG. 6, and FIG. 7. For similar descriptions, refer to the descriptions in the foregoing corresponding methods. To avoid repetition, details are not described herein again.

The communication apparatus 500 shown in FIG. 10 or the communication apparatus 600 shown in FIG. 11 may be a terminal device.

It should be further understood that division into the units in the apparatus is merely logical function division. During actual implementation, all or some of the units may be integrated into one physical entity, or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. The processing element herein may also be referred to as a processor, and may be an integrated circuit having a signal processing capability. In an implementation process, the steps in the foregoing method or the foregoing units may be implemented by using a hardware integrated logic circuit in the processing element, or may be implemented in a form of software invoked by the processing element.

For example, a unit in any one of the foregoing apparatuses may be one or more integrated circuits configured to implement the foregoing method, for example, one or more application-specific integrated circuits (ASICs), one or more digital signal processors (DSPs), one or more field programmable gate arrays (FPGAs), or a combination of at least two of these types of integrated circuits. For another example, when a unit in the apparatus is implemented by scheduling a program by a processing element, the processing element may be a general-purpose processor, for example, a central processing unit (CPU) or another processor that can invoke the program. For another example, the units may be integrated and implemented in a form of a system-on-a-chip (SOC).

Figure 12:
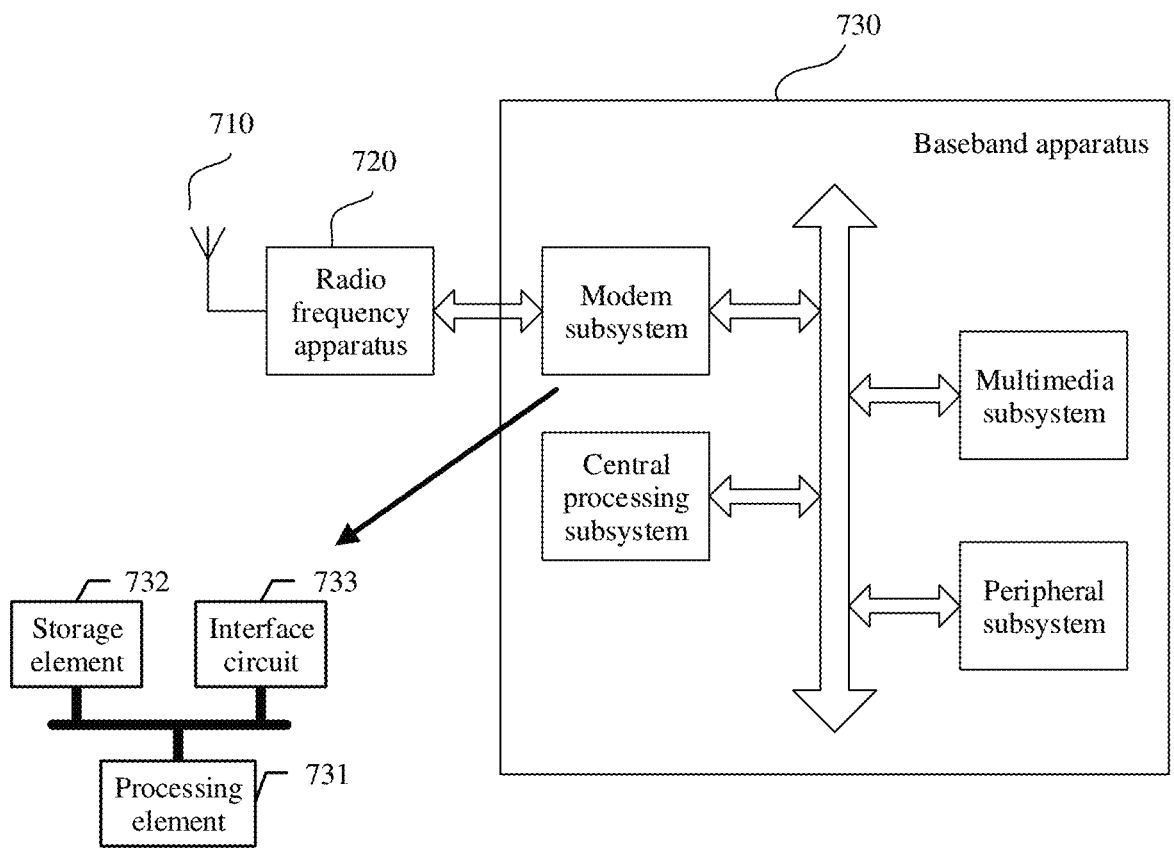
FIG. 12 is a schematic diagram of a terminal device according to an embodiment of this application.

FIG. 12 is a schematic diagram of a structure of a terminal device according to an embodiment of this application. The terminal device may be the second apparatus in the foregoing embodiments, and is configured to implement operations of the second apparatus in the foregoing embodiments. As shown in FIG. 12, the terminal device includes an antenna 710, a radio frequency apparatus 720, and a baseband apparatus 730. The antenna 710 is connected to the radio frequency apparatus 720. In a downlink direction, the radio frequency apparatus 720 receives, through the antenna 710, information sent by a network device, and sends the information, sent by the network device, to the baseband apparatus 730 for processing. In an uplink direction, the baseband apparatus 730 processes information of the terminal device, and sends the information to the radio frequency apparatus 720. The radio frequency apparatus 720 processes the information of the terminal device, and then sends the processed information to the network device through the antenna 710.

The baseband apparatus 730 may include a modem subsystem, configured to process data at each communication protocol layer. The baseband apparatus 730 may further include a central processing subsystem, configured to implement processing of an operating system and an application layer of the terminal. In addition, the baseband apparatus 730 may further include another subsystem, for example, a multimedia subsystem or a peripheral subsystem. The multimedia subsystem is configured to control a camera, a screen display, or the like of the terminal device, and the peripheral subsystem is configured to implement a connection to another device. The modem subsystem may be an independent chip. Optionally, the foregoing apparatus used in the terminal may be located in the modem subsystem.

The modem subsystem may include one or more processing elements 731, for example, include one main control CPU and another integrated circuit. In addition, the modem subsystem may further include a storage element 732 and an interface circuit 733. The storage element 732 is configured to store data and a program. However, a program used to perform the method performed by the terminal device in the foregoing methods may not be stored in the storage element 732, but is stored in a memory outside the modem subsystem. The interface circuit 733 is configured to communicate with another subsystem. The foregoing apparatus used in the terminal device may be located in the modem subsystem, and the modem subsystem may be implemented by a chip. The chip includes at least one processing element and an interface circuit. The processing element is configured to perform the steps of any one of the methods performed by the terminal device. The interface circuit is configured to communicate with another apparatus. In an implementation, units, in the terminal device, for implementing the steps in the foregoing method may be implemented by scheduling a program by a processing element. For example, the apparatus used in the terminal device includes a processing element and a storage element. The processing element invokes a program stored in the storage element, to perform the method performed by the terminal in the foregoing method embodiments. The storage element may be a storage element located on a same chip as the processing element, that is, an on-chip storage element.

In another implementation, a program used to perform the method performed by the terminal device in the foregoing methods may be in a storage element located on a different chip from the processing element, that is, an off-chip storage element. In this case, the processing element invokes or loads the program from the off-chip storage element to an on-chip storage element, to invoke and perform the method performed by the terminal in the foregoing method embodiments.

In still another implementation, units of the terminal device that implement the steps in the foregoing method may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

The units of the terminal device that implement the steps in the foregoing method may be integrated together, and implemented in a form of a system-on-a-chip (system-on-a-chip, SOC). The SOC chip is configured to implement the foregoing method.

Figure 13:
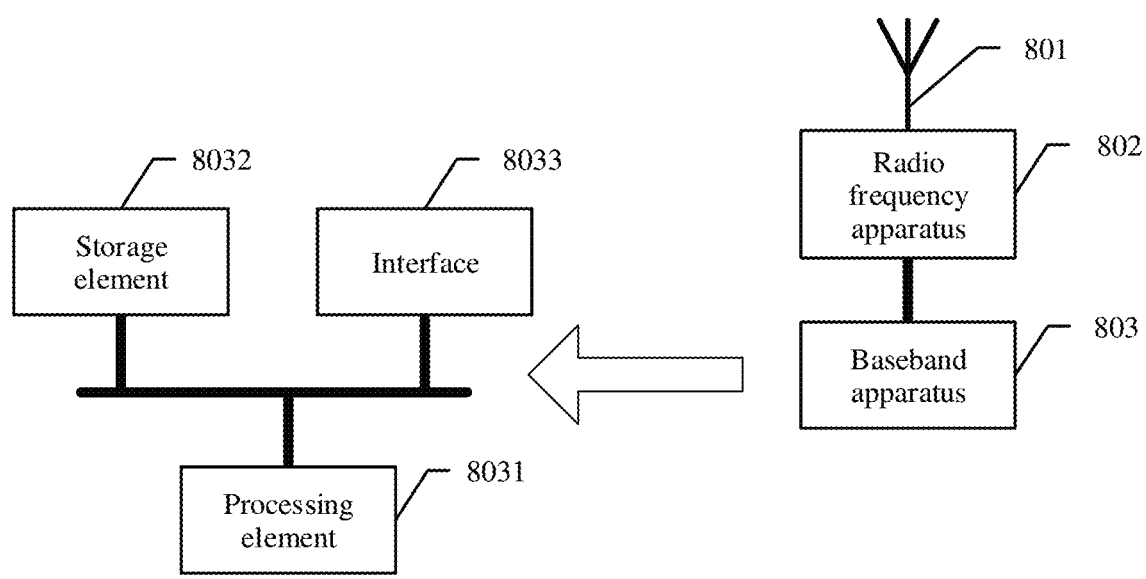
FIG. 13 is a schematic diagram of a network device according to an embodiment of this application.

FIG. 13 is a schematic diagram of a structure of a network device according to an embodiment of this application. The network device is configured to implement operations of the second apparatus in the foregoing embodiments. As shown in FIG. 13, the network device includes an antenna 801, a radio frequency apparatus 802, and a baseband apparatus 803. The antenna 801 is connected to the radio frequency apparatus 802. In an uplink direction, the radio frequency apparatus 802 receives, through the antenna 801, information sent by a terminal, and sends the information, sent by the terminal device, to the baseband apparatus 803 for processing. In a downlink direction, the baseband apparatus 803 processes information of the terminal, and sends the information to the radio frequency apparatus 802. The radio frequency apparatus 802 processes the information of the terminal device, and then sends the processed information to the terminal through the antenna 801.

The baseband apparatus 803 may include one or more processing elements 8031, for example, include one main control CPU and another integrated circuit. In addition, the baseband apparatus 803 may further include a storage element 8032 and an interface 8033. The storage element 8032 is configured to store a program and data. The interface 8033 is configured to exchange information with the radio frequency apparatus 802. The interface is, for example, a common public radio interface (CPRI). The foregoing apparatus used in the network device may be located in the baseband apparatus 803. For example, the foregoing apparatus used in the network device may be a chip on the baseband apparatus 803. The chip includes at least one processing element and an interface circuit. The processing element is configured to perform the steps of any one of the methods performed by the network device. The interface circuit is configured to communicate with another apparatus. In an implementation, units, in the network device, for implementing the steps in the foregoing method may be implemented by scheduling a program by a processing element. For example, the apparatus used in the network device includes a processing element and a storage element. The processing element invokes a program stored in the storage element, to perform the method performed by the network device in the foregoing method embodiments. The storage element may be a storage element located on a same chip as the processing element, that is, an on-chip storage element, or may be a storage element located on a different chip from the processing element, that is, an off-chip storage element.

In another implementation, units of the network device that implement the steps in the foregoing method may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

The units of the network device that implement the steps in the foregoing method may be integrated together, and implemented in a form of a system-on-a-chip. For example, the baseband apparatus includes the SOC chip, configured to implement the foregoing method.

The terminal device and the network device in the foregoing apparatus embodiments may completely correspond to the first apparatus or the second apparatus in the method embodiments, and a corresponding module or unit performs a corresponding step. For example, when the apparatus is implemented in a form of a chip, the receiving unit may be an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

An embodiment of this application further provides a communication system, and the communication system includes the first apparatus and the second apparatus, or includes the first apparatus, the second apparatus, and the third apparatus.

An embodiment of this application further provides a computer-readable medium, configured to store computer program code. The computer program includes instructions used to perform the communication method provided in the method 200 in the embodiments of this application. The readable medium may be a read-only memory (ROM) or a random access memory (RAM). This is not limited in this embodiment of this application.

This application further provides a computer program product. The computer program product includes instructions. When the instructions are executed, a first apparatus and a second apparatus are enabled to perform the operations corresponding to the first apparatus and the second apparatus in the foregoing method.

An embodiment of this application further provides a chip located in a communication apparatus. The chip includes a processing unit and a communication unit. The processing unit may be, for example, a processor, and the communication unit may be, for example, an input/output interface, a pin, or a circuit. The processing unit may execute computer instructions, so that the communication apparatus is enabled to perform any communication method provided in the foregoing embodiments of this application.

Optionally, the computer instructions are stored in a storage unit.

Optionally, the storage unit is a storage unit in the chip, for example, a register or a cache; or the storage unit may be a storage unit in the terminal but outside the chip, for example, a read-only memory (ROM), another type of static storage device capable of storing static information and instructions, or a random access memory (RAM). The processor mentioned in any one of the foregoing descriptions may be a CPU, a microprocessor, an ASIC, or one or more integrated circuits used to control program execution of the feedback information transmission method. The processing unit and the storage unit may be decoupled, separately disposed on different physical devices, and connected in a wired or wireless manner to implement functions of the processing unit and the storage unit respectively, to support the system chip in implementing various functions in the foregoing embodiments. Alternatively, the processing unit and the memory may be coupled on one device.

It may be understood that the memory in the embodiments of this application may be a volatile memory or a non-volatile memory, or may include both a volatile memory and a non-volatile memory. The non-volatile memory may be a ROM, a programmable read-only memory (PROM), an erasable programmable read-only memory (erasable PROM, EPROM), an electrically erasable programmable read-only memory (electrically EPROM, EEPROM), or a flash memory. The volatile memory may be a RAM and is used as an external cache. There are a plurality of different types of RAMs, such as a static random access memory (static RAM, SRAM), a dynamic random access memory (DRAM), a synchronous dynamic random access memory (SDRAM), a double data rate synchronous dynamic random access memory (DDR SDRAM), an enhanced synchronous dynamic random access memory (enhanced SDRAM, ESDRAM), a synchlink dynamic random access memory (SLDRAM), and a direct rambus random access memory (DR RAM).

The terms "system" and "network" may be used interchangeably in this specification. The term "and/or" in this specification describes only an association relationship for describing associated objects and represents that there may be three relationships. For example, A and/or B may represent the following three cases: Only A exists, both A and B exist, and only B exists. In addition, the character "/" in this specification generally represents an "or" relationship between the associated objects.

The term "uplink" or "downlink" in this application is used to describe a data/information transmission direction in a specific scenario. For example, an "uplink" direction is usually a direction in which data/information is transmitted from a terminal to a network side, or a direction in which data/information is transmitted from a distributed unit to a centralized unit; and a "downlink" direction is usually a direction in which data/information is transmitted from a network side to a terminal, or a direction in which data/information is transmitted from a centralized unit to a distributed unit. It can be understood that "uplink" or "downlink" is merely used to describe a data/information transmission direction, without limiting a specific starting or ending device of data/information transmission.

In this application, names may be assigned to various objects such as messages, information, devices, network elements, systems, apparatuses, actions, operations, procedures, and concepts. It can be understood that the specific names do not constitute a limitation on the related objects. The assigned names may vary with factors such as scenarios, contexts, or usage habits. Understanding of technical meanings of technical terms in this application should be determined mainly based on functions and technical effects embodied or performed by the technical terms in the technical solutions.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

All or some of the methods in the embodiments of this application may be implemented by software, hardware, firmware, or any combination thereof. When the software is used to implement the embodiments, all or some of the embodiments may be implemented in a form of a computer program product. The computer program product includes one or more computer programs or instructions. When the computer programs or instructions are loaded and executed on the computer, the procedure or functions according to the embodiments of this application are completely or partially generated. The computer may be a general-purpose computer, a dedicated computer, a computer network, or another programmable apparatus. The computer programs or instructions may be stored in a computer-readable storage medium, or may be transmitted by using the computer-readable storage medium. The computer-readable storage medium may be any usable medium accessible by a computer, or a data storage device, such as a server, integrating one or more usable media.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located at one position, or may be distributed on a plurality of network units. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium, for example, a USB flash drive, a removable hard disk, a read-only memory (ROM), a random access memory (RAM), a magnetic disk, or an optical disc, that can store program code.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    establishing a first radio link control (RLC) entity and a second RLC entity, wherein the first RLC entity and the second RLC entity are associated with a first packet data convergence protocol (PDCP) entity, the first RLC entity corresponds to a unicast transmission mode, and the second RLC entity corresponds to a multicast transmission mode;
    sending first indication information to a second apparatus, wherein the first indication information indicates that a third RLC entity of the second apparatus corresponds to the unicast transmission mode and a fourth RLC entity of the second apparatus corresponds to the multicast transmission mode, and wherein the third RLC entity and the fourth RLC entity are associated with a second PDCP entity;
    scrambling using a cell radio network temporary identifier (C-RNTI), at a physical layer, first data from the first RLC entity or scrambling using a group radio network temporary identifier (G-RNTI), at the physical layer, second data from the second RLC entity; and
    sending the first data or the second data.

2. The method according to claim 1, wherein:
    the first indication information further indicates a type of the third RLC entity and a type of the fourth RLC entity; or
    the first indication information comprises radio network temporary identifier (RNTI) type information corresponding to the third RLC entity and RNTI type information corresponding to the fourth RLC entity.

3. The method according to claim 2, wherein an RNTI type corresponding to the third RLC entity is the C-RNTI, and an RNTI type corresponding to the fourth RLC entity is the G-RNTI.

4. The method according to claim 1, further comprising:
    receiving third indication information from a third apparatus, wherein the third indication information indicates that the first RLC entity corresponds to the unicast transmission mode and the second RLC entity corresponds to the multicast transmission mode.

5. The method according to claim 1, further comprising:
    sending second indication information to the second apparatus,
    wherein the second indication information indicates a first radio bearer and a first transmission mode corresponding to the first radio bearer, and the first radio bearer comprises the second PDCP entity, and
    wherein the first transmission mode is the unicast transmission mode, the multicast transmission mode, or the unicast transmission mode and the multicast transmission mode.

6. A method, comprising:
receive first indication information from a first apparatus, wherein the first indication information indicates that a third radio link control (RLC) entity corresponds to a unicast transmission mode and a fourth RLC entity corresponds to a multicast transmission mode;
establishing the third RLC entity and the fourth RLC entity, wherein the third RLC entity and the fourth RLC entity are associated with a second packet data convergence protocol (PDCP) entity;
receiving first data scrambled at a physical layer of the first apparatus using a cell radio network temporary identifier (C-RNTI) or second data scrambled at the physical layer of the first apparatus using a group radio network temporary identifier (G-RNTI); and
delivering the first data to the third RLC entity or the second data to the fourth RLC entity.

7. The method according to claim 6, wherein establishing the third RLC entity and the fourth RLC entity comprises:
establishing the third RLC entity and the fourth RLC entity based on the first indication information.

8. The method according to claim 7, wherein:
the first indication information further indicates a type of the third RLC entity and a type of the fourth RLC entity; or
the first indication information comprises radio network temporary identifier (RNTI) type information corresponding to the third RLC entity and RNTI type information corresponding to the fourth RLC entity.

9. The method according to claim 8, wherein an RNTI type corresponding to the third RLC entity is the C-RNTI, and an RNTI type corresponding to the fourth RLC entity is the G-RNTI.

10. The method according to claim 6, further comprising:
delivering the first data scrambled using the C-RNTI to the third RLC entity; or
delivering the received first second data scrambled using the G-RNTI to the fourth RLC entity.

11. The method according to claim 6, further comprising:
receiving second indication information from the first apparatus,
wherein the second indication information indicates a first radio bearer and a first transmission mode corresponding to the first radio bearer, and the first radio bearer comprises the second PDCP entity, and
wherein the first transmission mode is the unicast transmission mode, the multicast transmission mode, or the unicast transmission mode and the multicast transmission mode.

12. An apparatus, comprising:
one or more processors, and
a memory configure to store program instructions that are executable by the one or more processors;
wherein the program instructions include instructions that, when executed, cause the apparatus to:
establish a first radio link control (RLC) entity and a second RLC entity, wherein the first RLC entity and the second RLC entity are associated with a first packet data convergence protocol (PDCP) entity, the first RLC entity corresponds to a unicast transmission mode, and the second RLC entity corresponds to a multicast transmission mode;
send first indication information to a second apparatus, wherein the first indication information indicates that a third RLC entity of the second apparatus corresponds to the unicast transmission mode and a fourth RLC entity of the second apparatus corresponds to the multicast transmission mode, and wherein the third RLC entity and the fourth RLC entity are associated with a second PDCP entity;
scramble using a cell radio network temporary identifier (C-RNTI), at a physical layer, first data from the first RLC entity or scramble using a group radio network temporary identifier (G-RNTI), at the physical layer, second data from the second RLC entity; and
send the first data or the second data.

13. The apparatus according to claim 12, wherein:
the first indication information further indicates a type of the third RLC entity and a type of the fourth RLC entity; or
the first indication information comprises radio network temporary identifier (RNTI) type information corresponding to the third RLC entity and RNTI type information corresponding to the fourth RLC entity.

14. The apparatus according to claim 13, wherein an RNTI type corresponding to the third RLC entity is the C-RNTI, and an RNTI type corresponding to the fourth RLC entity is the G-RNTI.

15. The apparatus according to claim 12, wherein the program instructions include instructions that, when executed, further cause the apparatus to:
receive third indication information from a third apparatus, wherein the third indication information indicates that the first RLC entity corresponds to the unicast transmission mode and the second RLC entity corresponds to the multicast transmission mode.

16. An apparatus, comprising:
one or more processors; and
a memory configure to store program instructions that are executable by the one or more processors;
wherein the program instructions include instructions that, when executed, cause the apparatus to:
receive first indication information from a first apparatus, wherein the first indication information indicates that a third radio link control (RLC) entity corresponds to a unicast transmission mode and a fourth RLC entity corresponds to a multicast transmission mode;
establish the third RLC entity and the fourth RLC entity, wherein the third RLC entity and the fourth RLC entity are associated with a second packet data convergence protocol (PDCP) entity;
receive first data scrambled at a physical layer of the first apparatus using a cell radio network temporary identifier (C-RNTI) or second data scrambled at the physical layer of the first apparatus using a group radio network temporary identifier (G-RNTI); and
deliver the first data to the third RLC entity or the second data to the fourth RLC entity.

17. The apparatus according to claim 16, wherein the program instructions include instructions that, when executed, further cause the apparatus to:
establish the third RLC entity and the fourth RLC entity based on the first indication information.

18. The apparatus according to claim 17, wherein:
the first indication information further indicates a type of the third RLC entity and a type of the fourth RLC entity; or
the first indication information comprises radio network temporary identifier (RNTI) type information corresponding to the third RLC entity and RNTI type information corresponding to the fourth RLC entity.

19. The apparatus according to claim 18, wherein an RNTI type corresponding to the third RLC entity is the C-RNTI, and an RNTI type corresponding to the fourth RLC entity is the G-RNTI.

20. The apparatus according to claim 16, wherein the program instructions include instructions that, when executed, further cause the apparatus to:
deliver the received first data scrambled using the C-RNTI to the third RLC entity; or
deliver the received first data scrambled using the G-RNTI to the fourth RLC entity.

* * * * *

UNITED STATES PATENT AND TRADEMARK OFFICE
CERTIFICATE OF CORRECTION

PATENT NO. : 12,200,787 B2  
APPLICATION NO. : 17/648620  
DATED : January 14, 2025  
INVENTOR(S) : Xu et al.

Page 1 of 1

It is certified that error appears in the above-identified patent and that said Letters Patent is hereby corrected as shown below:

In the Claims

In Column 33, in Claim 10, Line 37, after "delivering the" delete "received first".

Signed and Sealed this
Eighteenth Day of February, 2025

Coke Morgan Stewart
*Acting Director of the United States Patent and Trademark Office*